(12) United States Patent
Tanaka et al.

(10) Patent No.: US 10,303,072 B2
(45) Date of Patent: May 28, 2019

(54) TONER, DEVELOPER, AND IMAGE FORMING DEVICE

(71) Applicants: Akira Tanaka, Shizuoka (JP);
Hiroyuki Takeda, Kanagawa (JP);
Junichi Awamura, Shizuoka (JP);
Hiroshi Yamada, Shizuoka (JP); Daichi Hisakuni, Shizuoka (JP); Yasuo Kamada, Kanagawa (JP)

(72) Inventors: Akira Tanaka, Shizuoka (JP);
Hiroyuki Takeda, Kanagawa (JP);
Junichi Awamura, Shizuoka (JP);
Hiroshi Yamada, Shizuoka (JP); Daichi Hisakuni, Shizuoka (JP); Yasuo Kamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/889,461

(22) Filed: Feb. 6, 2018

(65) Prior Publication Data
US 2018/0224763 A1   Aug. 9, 2018

(30) Foreign Application Priority Data

Feb. 8, 2017 (JP) .................. 2017-021001
May 9, 2017 (JP) .................. 2017-093061
Dec. 25, 2017 (JP) .................. 2017-247632

(51) Int. Cl.
*G03G 9/087* (2006.01)
*C08G 63/42* (2006.01)
(Continued)

(52) U.S. Cl.
CPC ..... *G03G 9/08755* (2013.01); *C08G 18/4219* (2013.01); *C08G 18/4255* (2013.01);
(Continued)

(58) Field of Classification Search
CPC ................... G03G 9/08797; G03G 9/08755
See application file for complete search history.

(56) References Cited

U.S. PATENT DOCUMENTS 5,747,210 A    5/1998 Emoto et al.
2006/0204883 A1    9/2006 Nakayama et al.
(Continued)

FOREIGN PATENT DOCUMENTS

JP    63-109447    5/1988
JP    5-088403    4/1993
(Continued)

OTHER PUBLICATIONS

U.S. Appl. No. 15/522,567, filed Oct. 8, 2015, Tsuyoshi Sugimoto, et al.

(Continued)

*Primary Examiner* — Peter L Vajda
(74) *Attorney, Agent, or Firm* — Oblon, McClelland, Maier & Neustadt, L.L.P.

(57) ABSTRACT

A toner is provided. The toner contains a polyester resin. The toner has a glass transition temperature (Tg1st) at first temperature rising of differential scanning calorimetry (DSC) of from 45° C. to 65° C. The toner includes a component insoluble in tetrahydrofuran (THF) having two glass transition temperatures (Tga1st and Tgb1st) at the first temperature rising of DSC, where Tga1st is in a range of −45° C. to 5° C. and Tgb1st is in a range of 45° C. to 70° C. The toner includes a component soluble in THF having a glass transition temperature (Tg2nd) at second temperature rising of DSC of from 40° C. to 65° C.

13 Claims, 3 Drawing Sheets

(51) Int. Cl.
*C08G 63/20* (2006.01)
*G03G 15/00* (2006.01)
*C08G 63/195* (2006.01)
*C08G 63/16* (2006.01)
*C08G 63/66* (2006.01)
*C08G 18/75* (2006.01)
*C08G 18/42* (2006.01)

(52) U.S. Cl.
CPC .......... *C08G 18/755* (2013.01); *C08G 63/16* (2013.01); *C08G 63/195* (2013.01); *C08G 63/20* (2013.01); *C08G 63/42* (2013.01); *C08G 63/66* (2013.01); *G03G 9/08795* (2013.01); *G03G 9/08797* (2013.01); *G03G 15/00* (2013.01); *G03G 2215/0607* (2013.01)

(56) References Cited

U.S. PATENT DOCUMENTS

| | | | |
|---|---|---|---|
| 2011/0255899 A1 | 10/2011 | Iwamoto et al. | |
| 2011/0311246 A1 | 12/2011 | Masuda et al. | |
| 2014/0080046 A1* | 3/2014 | Asahina | G03G 9/0821 430/105 |
| 2016/0231661 A1 | 8/2016 | Nagai et al. | |
| 2016/0259257 A1 | 9/2016 | Sugimoto et al. | |

FOREIGN PATENT DOCUMENTS

| | | |
|---|---|---|
| JP | 6-059504 | 3/1994 |
| JP | 9-251217 | 9/1997 |
| JP | 11-133665 | 5/1999 |
| JP | 2000-181119 | 6/2000 |
| JP | 2001-158819 | 6/2001 |
| JP | 2002-023419 | 1/2002 |
| JP | 2002-287400 | 10/2002 |
| JP | 2002-351143 | 12/2002 |
| JP | 2003-098875 | 4/2003 |
| JP | 2004-046095 | 2/2004 |
| JP | 2004-177656 | 6/2004 |
| JP | 2004-226580 | 8/2004 |
| JP | 2005-196056 | 7/2005 |
| JP | 2005-258106 | 9/2005 |
| JP | 2007-271789 | 10/2007 |
| JP | 2008-065220 | 3/2008 |
| JP | 2008-116960 | 5/2008 |
| JP | 2009-069351 | 4/2009 |
| JP | 2010-204431 | 9/2010 |
| JP | 2011-118094 | 6/2011 |
| JP | 2011-141514 | 7/2011 |
| JP | 2011-191725 | 9/2011 |
| JP | 2012-022298 | 2/2012 |
| JP | 2012-118362 | 6/2012 |
| JP | 2012-177855 | 9/2012 |
| JP | 2014-199430 | 10/2014 |
| JP | 2015-052697 | 3/2015 |
| JP | 2015-118151 | 6/2015 |
| JP | 2015-148668 | 8/2015 |
| JP | 2016-164616 | 9/2016 |
| WO | WO2008/126865 A1 | 10/2008 |

OTHER PUBLICATIONS

U.S. Appl. No. 15/538,717, filed Nov. 30, 2015, Hideyuki Santo, et al.

* cited by examiner

TONER, DEVELOPER, AND IMAGE FORMING DEVICE

CROSS-REFERENCE TO RELAYED APPLICATIONS

This patent application is based on and claims priority pursuant to 35 U.S.C. § 119(a) to Japanese Patent Application Nos. 2017-021001, 2017-093061, and 2017-247632 filed on Feb. 8, 2017, May 9, 2017, and Dec. 25, 2017, respectively, in the Japan Patent Office, the entire disclosure of each of which is hereby incorporated by reference herein.

BACKGROUND

Technical Field

The present disclosure relates to a toner, a developer, and an image forming device.

Description of the Related Art

Recently, a toner is required to have a small particle diameter and high temperature offset-resistant properties for high quality of an output image, low temperature fixing properties for energy saving, and heat resistant preservability resistant to high temperature and high humidity at the time of storage or conveyance after producing. In particular, consumed power at the time of fixing occupies most of the consumed power in an image forming step, and thus, low temperature fixing properties are required to be improved.

In a related art, a toner prepared by a kneading and grinding method is used. However, it is difficult for the toner prepared by the kneading and grinding method to have a small particle diameter, and the toner is in an indefinite shape and has a broad particle size distribution, and thus, the quality of the output image is not sufficient, and fixing energy is high. In a case where wax (a release agent) is added in order to improve fixing properties, the toner prepared by the kneading and grinding method is broken on an interface with respect to the wax at the time of ground, and thus, a large amount of wax exists on a toner surface. Therefore, a releasing effect can be obtained, but adherence (filming) of the toner with respect to a carrier, a photoconductor, and a blade easily occurs, and thus, the overall performance is not satisfactory.

Therefore, in order to solve the disadvantages of the kneading and grinding method, a method for producing a toner by a polymerization method is proposed. A toner produced by the polymerization method has a small particle diameter, and a sharp particle size distribution compared to the toner produced by the kneading and grinding method, and is also capable of including a release agent.

In order to obtain a high level of low temperature fixing properties, a toner containing a crystalline polyester resin is proposed.

In the proposed technologies, the crystalline polyester resin is rapidly melted compared to an amorphous polyester resin, and thus, low temperature fixing can be obtained. However, in a case where the toner contains the crystalline polyester resin, an aggregate of the toner is generated in a high temperature and high humidity environment. Recently, there has been a problem that, when the toner is fixed onto a paper surface, the toner adheres to the paper due to a pressure according to paper weight at the time of being stacked in a paper ejection tray and residual heat at the time of fixing (paper ejection blocking), or a problem that an image defect (crumpling) occurs due to a toner deterioration, which occurs due to a stress received on the toner in a developing device.

Recently, a toner to be used in an ultrahigh speed print system is required to continuously output images with constant image quality, and to correspond with respect to a paper type since various papers are used, even in a severe use condition such as a change in temperature and humidity of a use environment of the image forming device, and continuous output of a large number of sheets of images.

SUMMARY

In accordance with some embodiments of the present invention, a toner is provided. The toner contains a polyester resin. The toner has a glass transition temperature ($Tg1st$) at first temperature rising of differential scanning calorimetry (DSC) of from 45° C. to 65° C. The toner includes a component insoluble in tetrahydrofuran (THF) having two glass transition temperatures ($Tga1st$ and $Tgb1st$) at the first temperature rising of DSC, where $Tga1st$ is in a range of −45° C. to 5° C. and $Tgb1st$ is in a range of 45° C. to 70° C. The toner includes a component soluble in THF having a glass transition temperature ($Tg2nd$) at second temperature rising of DSC of from 40° C. to 65° C.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
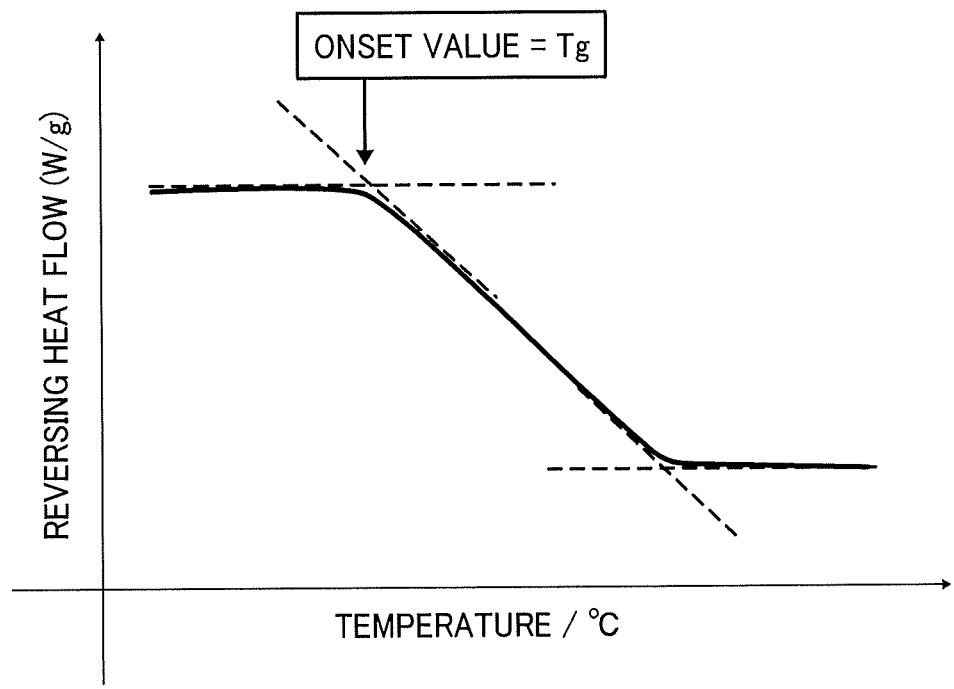
FIG. 1 is a graph for illustrating an obtaining method of Tg in a DSC curve.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components)

having the same function or shape and redundant descriptions thereof are omitted below.

Hereinafter, a toner, a developer, and an image forming device according to the present disclosure will be described with reference to the drawings. The present disclosure is not limited to the following embodiments, and can be changed within a range, which can be conceived by a person skilled in the art, such as other embodiments, additions, amendments, and deletions, and any aspects are included in the scope of the present disclosure insofar as the function and the effect of the present disclosure are obtained.

According to the present disclosure, it is possible to provide a toner in which low temperature fixing properties, high temperature-resistant offset properties, heat resistant preservability, and image gloss are excellent, and an excellent image can be formed regardless of a paper type.

(Toner)

In the present disclosure, a toner contains a polyester resin, in which a glass transition temperature (Tg1st) at first temperature rising of differential scanning calorimetry (DSC) of the toner is 45° C. to 65° C., a glass transition temperature (Tg1st) of a component insoluble in tetrahydrofuran (THF) of the toner at the first temperature rising of DSC is observed at two points of Tga1st and Tgb1st, Tga1st is in a range of −45° C. to 5° C., and Tgb1st is in a range of 45° C. to 70° C., and a glass transition temperature (Tg2nd) of a component soluble in THF of the toner at second temperature rising of DSC is 40° C. to 65° C.

It is preferable that the component insoluble in THF is a polyester resin, and components attributable to the glass transition temperatures Tga1st and Tgb1st at two points at the first temperature rising of DSC are set to a polyester resin component A and a polyester resin component B, respectively. In such a case, it is preferable that the component insoluble in THF of the toner contains the polyester resin component A of which the glass transition temperature (Tg2nd) at the second temperature rising of DSC is −50° C. to 0° C., and the polyester resin component B of which the glass transition temperature (Tg2nd) at the second temperature rising of DSC is 45° C. to 65° C. The component insoluble in THF indicating the glass transition temperatures at two points is derived from two types of polyesters (prepolymers) having different physical properties.

It is preferable that a glass transition temperature (Tg2nd') of the component insoluble in THF of the toner at the second temperature rising of DSC is 0° C. to 50° C.

It is preferable that the component soluble in THF is a polyester resin, and a component attributable to the glass transition temperature (Tg2nd) of the component soluble in THF of the toner at the second temperature rising of DSC is set to a polyester resin component C. In such a case, it is preferable that the component soluble in THF of the toner contains the polyester resin component C of which the glass transition temperature (Tg2nd) at the second temperature rising of DSC is 40° C. to 65° C.

Hereinafter, the glass transition temperature Tg of the polyester resin components A, B, and C indicates the glass transition temperature Tg2nd at the second temperature rising, unless otherwise particularly noted.

The polyester resin component A and the polyester resin component B insoluble in THF mainly include a component derived from an amorphous polyester resin having a large weight average molecular weight (Mw) of 100,000 to 200,000, and the polyester resin component C soluble in THF mainly includes a component derived from an amorphous polyester resin having a weight average molecular weight (Mw) of 3,000 to 10,000.

The polyester resin component A imparts plasticity to the toner. The polyester resin component A insoluble in tetrahydrofuran (THF) decreases Tg or a melt viscosity, has a branch structure in its molecular skeleton while ensuring low temperature fixing properties, and has a molecular chain having a three-dimensional mesh structure, and thus, has rubbery properties such that the component is deformed at a low temperature but does not flow.

In a related art, the disadvantages are attempted to be solved by appropriately adjusting a ratio between the polyester resin component A and the polyester resin component C. However, in a case where the polyester resin component A is excessively large in amount, Tg decreases, and thus, it is not possible to ensure preservability. Moreover, stress resistance of the toner is degraded, a fluidizer or the like on the toner surface is embedded due to a thermal and mechanical stress caused by stirring in the developing device, and thus, an adhesion force between toner particles increases. As a result, in a transfer process, there is a concern that a defect such as image crumpling occurs. On the other hand, in a case where the polyester resin component A is excessively small in amount, the plasticity is insufficiently imparted, and thus, the low temperature fixing properties is not satisfied. Moreover, required elasticity is not imparted, and high temperature offset is degraded, and thus, there is a concern that a fixable region narrows, and image glossiness excessively increases.

In the present disclosure, by using the polyester resin component B, which has the same level of Tg as Tg of the toner and imparts the elasticity, together, it is possible to impart the elasticity while ensuring Tg, to ensure an offset region, to decrease the image crumpling, and to control the image gloss in an appropriate region. Here, the reason is not clear, but it has been found that when the components are mixed at an arbitrary ratio, the resin components are separated, a pigment dispersion defect occurs, and thus, a degree of coloring decreases. It has been found that the polyester resin components A, B, and C are set to have a suitable component ratio, and thus, it is possible to ensure the fixing region and the preservability without decreasing the degree of coloring, and a more excellent toner can be obtained.

It is preferable that the glass transition temperature (Tg1st) at the first temperature rising of the differential scanning calorimetry (DSC) of the toner and the glass transition temperature (Tg2nd) at the second temperature rising of DSC satisfy the following formula:

$$Tg1st-Tg2nd \geq 10 \ [° \ C.].$$

Specifically, setting Tg1st−Tg2nd to be higher than or equal to 10° C. can be attained by using a crystalline resin as a binder resin or by containing a part of the crystalline resin. Setting Tg1st−Tg2nd to be higher than or equal to 10° C. indicates that the crystalline resin and a binder resin other than the crystalline resin are compatible with each other, and a glass transition temperature of the binder resin decreases, and thus, excellent low temperature fixing properties can be attained.

<Polyester Resin Component A Insoluble in Tetrahydrofuran (THF)>

It is preferable that the polyester resin component A contains a polyvalent alcohol component and a polyvalent carboxylic acid component as structural components, and a diol component is preferable as the polyvalent alcohol component. A dicarboxylic acid is preferable as the polyvalent carboxylic acid component.

Examples of the diol component include an aliphatic diol having 3 to 10 carbon atoms.

Examples of the aliphatic diol having 3 to 10 carbon atoms include 1,2-propylene glycol, 1,3-propylene glycol, 1,4-butanediol, 2-methyl-1,3-propanediol, 1,5-pentanediol, 3-methyl-1,5-pentanediol, 1,6-hexanediol, 1,8-octanediol, 1,10-decanediol, and 1,12-dodecanediol.

The content of the aliphatic diol having 3 to 10 carbon atoms in the diol component is preferably greater than or equal to 50 mol %, and is more preferably greater than or equal to 80 mol %.

Diol components, in which the number of carbon atoms in the main chain is an odd number of 3 to 9 and an alkyl group is on a side chain, are preferable as the diol component of the polyester resin component A, and among them, a diol component having a structure represented by General Formula (1) described below is preferable.

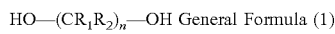

HO—(CR$_1$R$_2$)$_n$—OH  General Formula (1)

In the formula described above, R$_1$ and R$_2$ each independently represent a hydrogen atom or an alkyl group having 1 to 3 carbon atoms. n represents an odd number of 3 to 9. In n repeating units, R$_1$ and R$_2$ may be identical to each other, or may be different from each other.

It is preferable that the polyester resin component A contains a cross-linking component. It is preferable that a trivalent or higher aliphatic alcohol component is contained as the cross-linking component, and it is more preferable that a trivalent or tetravalent aliphatic alcohol component is contained, from the viewpoint of the gloss of a fixing image and an image density. A trivalent or tetravalent aliphatic polyvalent alcohol component having 3 to 10 carbon atoms is preferable as the trivalent or tetravalent aliphatic alcohol component. The cross-linking component may contain the trivalent or higher aliphatic alcohol described above alone.

The trivalent or higher aliphatic alcohol described above can be suitably selected according to the object, and examples of the trivalent or higher aliphatic alcohol include glycerin, trimethylolethane, trimethylolpropane, pentaerythritol, sorbitol, and dipentaerythritol. Only one type of such trivalent or higher aliphatic alcohols may be independently used, or two or more types thereof may be used together.

A trivalent or higher carboxylic acid or an epoxy compound can be used as the cross-linking component of the polyester resin component A, and it is more preferable that a trivalent or higher aliphatic alcohol is contained as the cross-linking component, for suppressing the occurrence of unevenness and of obtaining sufficient gloss or an image density.

A ratio of the cross-linking component in the structural components of the polyester resin component A is not particularly limited, and can be suitably selected according to the object, but is preferably 0.5 mass % to 5 mass %, and is more preferably 1 mass % to 3 mass %.

A ratio of the trivalent or higher aliphatic alcohol in the polyvalent alcohol component, which is one of the structural components of the polyester resin component A, is not particularly limited, and can be suitably selected according to the object, but is preferably 50 mass % to 100 mass %, and is more preferably 90 mass % to 100 mass %.

It is preferable that an aliphatic dicarboxylic acid having 4 to 12 carbon atoms is contained in the dicarboxylic acid component of the polyester resin component A, and the content of the aliphatic dicarboxylic acid in the dicarboxylic acid component is greater than or equal to 50 mol %.

Examples of the aliphatic dicarboxylic acid having 4 to 12 carbon atoms described above include succinic acid, glutaric acid, adipic acid, pimelic acid, suberic acid, azelaic acid, sebacic acid, and dodecanedioic acid.

It is preferable that the polyester resin component A has at least one of a urethane bond and a urea bond, from the viewpoint of more excellent fixing properties with respect to a recording medium such as paper. Accordingly, the urethane bond or the urea bond exhibits a behavior such as a pseudo cross-linking point, rubbery properties of the polyester resin component A strengthen, and heat resistant preservability and high temperature offset-resistant properties of the toner are more excellent.

A molecular weight of the polyester resin component A is not particularly limited, and can be suitably selected according to the object. However, in a case where the molecular weight is excessively low, there is a case where the heat resistant preservability of the toner and durability with respect to a stress caused by the stirring in the developing machine are degraded, and in a case where the molecular weight is excessively high, viscoelasticity of the toner at the time of being melted increases, and thus, there is a case where the low temperature fixing properties are degraded. Accordingly, in gel permeation chromatography (GPC) measurement, it is preferable that a weight average molecular weight (Mw) is 100,000 to 200,000.

Tg of the polyester resin component A is preferably −50° C. to 0° C., and is more preferably −40° C. to −20° C. In a case where Tg described above is higher than or equal to −50° C., the heat resistant preservability of the toner and the durability with respect to a stress caused by the stirring in the developing machine are improved, and filming resistance is improved. On the other hand, in a case where Tg described above is lower than or equal to 0° C., deformation due to heating and pressurizing at the time of fixing the toner is excellent, and thus, the low temperature fixing properties are improved.

<Polyester Resin Component B Insoluble in Tetrahydrofuran (THF)>

It is preferable that the polyester resin component B contains a polyvalent alcohol component and a polyvalent carboxylic acid component. It is preferable that the polyester resin component B is a modified polyester having an ester bond and a bond unit other than the ester bond, and it is preferable that a binder resin precursor is a resin precursor which is capable of generating the modified polyester described above.

Examples of the polyvalent alcohol component include alkylene glycols (e.g., ethylene glycol, 1,2-propylene glycol, 1,3-propylene glycol, 1,4-butanediol, and 1,6-hexanediol); alkylene ether glycols (e.g., diethylene glycol, triethylene glycol, dipropylene glycol, polyethylene glycol, polypropylene glycol, and polytetramethylene ether glycol); alicyclic diols (e.g., 1,4-cyclohexane dimethanol and hydrogenated bisphenol A); bisphenols (e.g., bisphenol A, bisphenol F, and bisphenol S); alkylene oxide (e.g., ethylene oxide, propylene oxide, and butylene oxide) adducts of alicyclic diols described above; alkylene oxide (e.g., ethylene oxide, propylene oxide, and butylene oxide) adducts of bisphenols described above; and two or more types thereof may be used together. Among them, alkylene glycols having 2 to 12 carbon atoms, and alkylene oxide adducts of bisphenols (for example, a bisphenol A ethylene oxide two-molar adduct, a bisphenol A propylene oxide two-molar adduct, and a bisphenol A propylene oxide three-molar adduct) are preferable.

Examples of trivalent or higher polyol include polyvalent aliphatic alcohols (e.g., glycerin, trimethylolethane, trimethylolpropane, pentaerythritol, and sorbitol); trivalent or higher phenols (e.g., phenol novolac and cresol novolac);

alkylene oxide adducts of trivalent or higher polyphenols; and two or more types thereof may be used together.

Examples of divalent carboxylic acid include alkylene dicarboxylic acids (e.g., succinic acid, adipic acid, and sebacic acid); alkenylene dicarboxylic acids (e.g., maleic acid and fumaric acid); aromatic dicarboxylic acids (e.g., terephthalic acid, isophthalic acid, and naphthalene dicarboxylic acid); and two or more types thereof may be used together. Among them, alkenylene dicarboxylic acids having 4 to 20 carbon atoms and aromatic dicarboxylic acids having 8 to 20 carbon atoms are preferable.

Examples of trivalent or higher polycarboxylic acid include aromatic polycarboxylic acid having 9 to 20 carbon atoms (e.g., trimellitic acid and pyromellitic acid), and two or more types thereof may be used together.

An anhydride or lower alkyl ester (e.g., methyl ester, ethyl ester, and isopropyl ester) of polycarboxylic acid may be used instead of the polycarboxylic acid.

It is preferable that the polyester resin component B has at least one of a urethane bond and a urea bond, from the viewpoint of more excellent fixing properties with respect to a recording medium such as paper. Accordingly, the urethane bond or the urea bond exhibits a behavior such as a pseudo cross-linking point, rubbery properties of the polyester resin component B strengthen, and heat resistant preservability and high temperature offset-resistant properties of the toner are more excellent.

Tg of the polyester resin component B is preferably 45° C. to 65° C., and is more preferably 50° C. to 60° C. In a case where Tg described above is higher than or equal to 45° C., the heat resistant preservability of the toner and the durability with respect to a stress caused by the stirring in the developing machine are improved, and the filming resistance is improved. On the other hand, in a case where Tg described above is lower than or equal to 65° C., deformation due to heating and pressurizing at the time of fixing the toner is excellent, and thus, the low temperature fixing properties are improved.

<Polyester Resin Component C Soluble in Tetrahydrofuran (THF)>

It is preferable that the polyester resin component C contains a diol component and a dicarboxylic acid component as structural components, and it is preferable that the diol component includes alkylene glycol in an amount greater than or equal to 40 mol %. The polyester resin component C may or may not contain a cross-linking component as the structural component.

A linear polyester resin is preferable as the polyester resin component C.

An unmodified polyester resin is preferable as the polyester resin component C. The unmodified polyester resin described above is a polyester resin which is obtained by using a polyvalent alcohol, and a polyvalent carboxylic acid or derivative thereof, such as a polyvalent carboxylic acid anhydride and a polyvalent carboxylic acid ester, and may is modified by an isocyanate compound or the like.

Examples of the polyvalent alcohol described above include a diol.

Examples of the diol described above include an alkylene (2 to 3 carbon atoms) oxide (an average addition molar number of 1 to 10) adducts of bisphenol A such as polyoxypropylene (2.2)-2,2-bis(4-hydroxy phenyl) propane and polyoxyethylene (2.2)-2,2-bis(4-hydroxy phenyl) propane; ethylene glycol and propylene glycol; and hydrogenated bisphenol A and an alkylene (2 to 3 carbon atoms) oxide (an average addition molar number of 1 to 10) adducts of hydrogenated bisphenol A.

Only one type of such diols may be independently used, or two or more types thereof may be used together.

Examples of the polyvalent carboxylic acid described above include a dicarboxylic acid.

Examples of dicarboxylic acid described above include adipic acid, phthalic acid, isophthalic acid, terephthalic acid, fumaric acid, maleic acid, and a succinic acid substituted with an alkyl group having 1 to 20 carbon atoms or alkenyl group having 2 to 20 carbon atoms, such as dodecenyl succinic acid and octyl succinic acid. In particular, it is preferable that the content of terephthalic acid in the polyvalent carboxylic acid is greater than or equal to 50 mol %.

Only one type of such dicarboxylic acids may be independently used, or two or more types thereof may be used together.

In order to adjust acid value and hydroxyl value, it is preferable that the polyester resin component C contains at least one of a trivalent or higher carboxylic acid and a trivalent or higher alcohol on a terminal of its resin chain.

Examples of the trivalent or higher carboxylic acid described above include trimellitic acid, pyromellitic acid, and acid anhydrides thereof.

Examples of the trivalent or higher alcohol described above include glycerin, pentaerythritol, and trimethylolpropane, and the like.

It is preferable that the polyester resin component C contains a cross-linking component. It is preferable that a trivalent or higher aliphatic alcohol is contained as the cross-linking component, and it is more preferable that a trivalent or tetravalent aliphatic alcohol is contained, from the viewpoint of the gloss of a fixing image and an image density. A trivalent or tetravalent aliphatic polyvalent alcohol component having 3 to 10 carbon atoms is preferable as the trivalent or tetravalent aliphatic alcohol. The cross-linking component described above may contain the trivalent or higher aliphatic alcohol described above alone.

The trivalent or higher aliphatic alcohol described above can be suitably selected according to the object, and examples of the trivalent or higher aliphatic alcohol include glycerin, trimethylolethane, trimethylolpropane, pentaerythritol, sorbitol, and dipentaerythritol. Only one type of such trivalent or higher aliphatic alcohols may be independently used, or two or more types thereof may be used together.

A trivalent or higher carboxylic acid or an epoxy compound can be used as the cross-linking component of the polyester resin component C, and it is more preferable that a trivalent or higher aliphatic alcohol is contained as the cross-linking component, for suppressing the occurrence of unevenness and of obtaining sufficient gloss or an image density.

A molecular weight of the polyester resin component C is not particularly limited, and can be suitably selected according to the object. However, in a case where the molecular weight is excessively low, there is a case where the heat resistant preservability of the toner and durability with respect to a stress caused by the stirring in the developing machine are degraded, and in a case where the molecular weight is excessively high, the viscoelasticity of the toner at the time of being melted increases, and thus, there is a case where the low temperature fixing properties are degraded. In a case where a component having a molecular weight of less than or equal to 600 excessively increases, there is a case where the heat resistant preservability of the toner and durability with respect to a stress caused by the stirring in the developing machine are degraded, and in a case where the component having a molecular weight of less than or equal to 600 excessively decreases, there is a case where the low temperature fixing properties are degraded.

Accordingly, in gel permeation chromatography (GPC) measurement, it is preferable that a weight average molecular weight (Mw) is 3,000 to 10,000, and it is preferable that a number average molecular weight (Mn) is 1,000 to 4,000. It is preferable that Mw/Mn is 1.0 to 4.0. It is more preferable that the weight average molecular weight (Mw) is 4,000 to 7,000, it is more preferable that number average molecular weight (Mn) is 1,500 to 3,000, and it is more preferable that Mw/Mn described above is 1.0 to 3.5.

It is preferable that the content of a component having a molecular weight of less than or equal to 600 in THF solubles is 2 mass % to 10 mass %. The polyester resin component C may be purified by being extracted by methanol, so that the component having a molecular weight of less than or equal to 600 may be removed.

An acid value of the polyester resin component C is not particularly limited, and can be suitably selected according to the object, but is preferably 1 mgKOH/g to 50 mgKOH/g, and is more preferably 5 mgKOH/g to 30 mgKOH/g. In a case where the acid value is greater than or equal to 1 mgKOH/g, the toner easily exhibits negative charging properties, and affinity between the paper and the toner at the time of fixing the toner onto the paper is excellent, and thus, the low temperature fixing properties can be improved. In contrast, in a case where the acid value is greater than 50 mgKOH/g, charging stability, in particular, charging stability with respect to an environment change decreases.

A hydroxyl value of the polyester resin component C is not particularly limited, and can be suitably selected according to the object, but is preferably greater than or equal to 5 mgKOH/g.

Tg of the polyester resin component C is preferably 40° C. to 65° C., is more preferably 45° C. to 65° C., and is even more preferably 50° C. to 60° C. In a case where Tg described above is higher than or equal to 40° C., the heat resistant preservability of the toner and the durability with respect to a stress caused by the stirring in the developing machine are improved, and the filming resistance is improved. On the other hand, in a case where Tg described above is lower than or equal to 65° C., deformation due to heating and pressurizing at the time of fixing the toner is excellent, and the low temperature fixing properties are improved.

The content of the polyester resin component C is preferably 80 parts by mass to 90 parts by mass, and is more preferably 80 parts by mass, with respect to 100 parts by mass of the toner. As with the present disclosure, in the case of three-component system of the polyester resin component A, the polyester resin component B, and the polyester resin component C, the reason is not clear, but in a case where the content of the polyester resin component C is less than 80 parts by mass, the polyester resin component A and the polyester resin component B are separated from each other, and thus, dispersibility of a pigment in the toner is degraded, and the degree of coloring of the toner decreases.

<Polyester Resin Having at Least One of Urethane Bond and Urea Bond>

The polyester resin having at least one of a urethane bond and a urea bond is not particularly limited, and can be suitably selected according to the object. Examples of the polyester resin include a reaction product between a polyester resin having an active hydrogen group and polyisocyanate. It is preferable that the reaction product is used as a reaction precursor which reacts with a curing agent described below (hereinafter, also referred to as a "prepolymer").

Examples of the polyester resin having an active hydrogen group include a polyester resin having hydroxyl.

—Polyisocyanate—

The polyisocyanate described above is not particularly limited, and can be suitably selected according to the object, and examples of the polyisocyanate described above include a diisocyanate and a trivalent or higher isocyanate.

Examples of the diisocyanate described above include aliphatic diisocyanates, alicyclic diisocyanates, aromatic diisocyanates, aromatic aliphatic diisocyanates, isocyanurates, and a material obtained by blocking the materials described above with a phenol derivative, oxime, or caprolactam.

Examples of the aliphatic diisocyanates described above include tetramethylene diisocyanate, hexamethylene diisocyanate, methyl 2,6-diisocyanatocaproate, octamethylene diisocyanate, decamethine diisocyanate, dodecamethylene diisocyanate, tetradecamethylene diisocyanate, trimethyl hexane diisocyanate, and tetramethyl hexane diisocyanate.

Examples of the alicyclic diisocyanates described above include isophorone diisocyanate and cyclohexylmethane diisocyanate.

Examples of the aromatic diisocyanates described above include tolylene diisocyanate, diisocyanatodiphenylmethane, 1,5-naphthylene diisocyanate, 4,4'-diisocyanatodiphenyl, 4,4'-diisocyanato-3,3'-dimethyl diphenyl, 4,4'-diisocyanato-3-methyl diphenylmethane, and 4,4'-diisocyanatodiphenyl ether.

Examples of the aromatic aliphatic diisocyanates described above include α,α,α',α'-tetramethyl xylylene diisocyanate.

Examples of the isocyanurates described above include tris(isocyanatoalkyl) isocyanurate and tris(isocyanatocycloalkyl) isocyanurate.

Only one type of such polyisocyanates may be independently used, or two or more types thereof may be used together.

—Curing Agent—

The curing agent is not particularly limited insofar as the curing agent reacts with the prepolymer, and can be suitably selected according to the object, and examples of the curing agent include an active hydrogen group-containing compound.

—Active Hydrogen Group-Containing Compound—

An active hydrogen group in the active hydrogen group-containing compound is not particularly limited, and can be suitably selected according to the object, and examples of the active hydrogen group include a hydroxyl group (e.g., alcoholic hydroxyl group and phenolic hydroxyl group), an amino group, a carboxyl group, and a mercapto group. Only one type of such active hydrogen groups may be independently used, or two or more types thereof may be used together.

Amines are preferable as the active hydrogen group-containing compound, from the viewpoint of enabling a urea bond to be formed.

Examples of the amines described above include diamines, trivalent or higher amines, aminoalcohols, aminomercaptans, amino acids, and a material obtained by blocking an amino group thereof. Only one type of such amines may be independently used, or two or more types thereof may be used together.

Among them, diamines, or a mixture between a diamine and a small amount of a trivalent or higher amine is preferable.

Examples of the diamine described above include aromatic diamine, alicyclic diamine, and aliphatic diamine. Examples of the aromatic diamine described above include phenylenediamine, diethyl toluene diamine and 4,4'-diaminodiphenylmethane. Examples of the alicyclic diamine described above include 4,4'-diamino-3,3'-dimethyl dicyclohexylmethane, diaminocyclohexane, and isophoronediamine. Examples of the aliphatic diamine described above include ethylene diamine, tetramethylene diamine, and hexamethylenediamine.

Examples of the trivalent or higher amine described above include diethylenetriamine and triethylene tetramine.

Examples of the aminoalcohol described above include ethanol amine and hydroxy ethyl aniline.

Examples of the aminomercaptan described above include aminoethyl mercaptan and aminopropyl mercaptan.

Examples of the amino acid described above include aminopropionic acid and aminocaproic acid.

Examples of the material obtained by blocking the amino group include a ketimine compound obtained by blocking the amino group with ketones such as acetone, methyl ethyl ketone, and methyl isobutyl ketone; and an oxazoline compound.

Molecular structures of the polyester resin components A, B, and C, can be confirmed by X-ray diffraction, GC/MS, LC/MS, IR measurement, and the like, in addition to NMR measurement in a solution or a solid. Simply, a method of detecting a component not having absorption based on $\delta CH$ (out-of-plane bending vibration) of olefin at $965\pm10$ cm$^{-1}$ and $990\pm10$ cm$^{-1}$ in an infrared absorption spectrum, as a polyester resin, is used.

<Crystalline Polyester Resin D>

A crystalline polyester resin D (hereinafter, simply referred to as a crystalline polyester resin) will be described as an example of the crystalline resin. The crystalline polyester resin has high crystallinity, and exhibits heat melting characteristics representing a rapid viscosity decrease in the vicinity of a fixing initiation temperature. The crystalline polyester resin having such characteristics is used along with the polyester resin, and thus, the heat resistant preservability is excellent due to crystallinity until immediately before the melt initiation temperature, and a rapid viscosity decrease (sharp melt) due to fusion of the crystalline polyester resin is capable of occurring at the melt initiation temperature. Accordingly, the crystalline polyester resin gets compatible with the polyester resin, and is fixed by rapidly decreasing the viscosity, and thus, a toner having excellent heat resistant preservability and excellent low temperature fixing properties can be obtained. In a releasing width (a difference between a fixing lower limit temperature and a high temperature-resistant offset occurrence temperature), an excellent result is obtained.

The crystalline polyester resin can be obtained by using a polyvalent alcohol and a polyvalent carboxylic acid or derivative thereof, such as a polyvalent carboxylic acid anhydride and a polyvalent carboxylic acid ester.

In the present disclosure, as described above, the crystalline polyester resin indicates a resin obtained by using a polyvalent alcohol and a polyvalent carboxylic acid or derivative thereof, such as a polyvalent carboxylic acid anhydride and a polyvalent carboxylic acid ester. Resins obtained by modifying a polyester resin, such as the prepolymer described above and a resin obtained by performing at least one of a cross-linking reaction and an extension reaction with respect to the prepolymer, do not belong to the crystalline polyester resin.

In the present disclosure, the presence or absence of crystallinity of the crystalline polyester resin can be confirmed by a crystal analysis X-ray diffraction device (for example, X'Pert Pro MRD, manufactured by Royal Philips). Hereinafter, a measurement method will be described.

First, a target sample is ground with mortar, and thus, a sample powder is prepared, and the obtained sample powder is evenly applied onto a sample holder. After that, the sample holder is set into the diffraction device, and measurement is performed, and thus, a diffraction spectrum is obtained. In the obtained diffraction peak, in a case where the peak half value width of a peak having the highest peak intensity among peaks obtained in a range of $20°<2\theta<25°$ is less than or equal to 2.0, it is determined that there is crystallinity.

In the present disclosure, contrarily to the crystalline polyester resin, a polyester resin not representing the state described above will be referred to as an amorphous polyester resin.

Hereinafter, an example of a measurement condition of X-ray diffraction will be described.

(Measurement Condition)
Tension kV: 45 kV
Current: 40 mA
MPSS
Upper
Gonio
Scanmode: continuos
Start angle: 3°
End angle: 35°
Angle Step: 0.02°
Lucident beam optics
Divergence slit: Div slit ½
Diflection beam optics
Anti scatter slit: As Fixed ½
Receiving slit: Prog rec slit —Polyvalent Alcohol—

The polyvalent alcohol described above is not particularly limited, and can be suitably selected according to the object, and examples of the polyvalent alcohol described above include diol and trivalent or higher alcohols.

Examples of the diols described above include saturated aliphatic diol. Examples of the saturated aliphatic diols described above include straight chain saturated aliphatic diols and branch saturated aliphatic diols, and among them, straight chain saturated aliphatic diols are preferable, and straight chain saturated aliphatic diols having carbon atoms of greater than or equal to 2 and less than or equal to 12 is more preferable. In a case where the saturated aliphatic diol described above is a branch saturated aliphatic diol, the crystallinity of the crystalline polyester resin decreases, and a melting point decreases. In a case where the number of carbon atoms in the saturated aliphatic diol described above is greater than 12, it is difficult to obtain such a material on practice. It is more preferable that the number of carbon atoms is less than or equal to 12.

Examples of the saturated aliphatic diols described above include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among them, ethylene glycol, 1,4-butanediol, 1,6-hexanediol, 1,8-octanediol, 1,10-decanediol, and 1,12-dodecanediol are preferable from the viewpoint of high crystallinity of the crystalline polyester resin and excellent sharp melting properties.

Examples of the trivalent or higher alcohols described above include glycerin, trimethylolethane, trimethylolpropane, and pentaerythritol. Only one type of such trivalent or higher alcohols may be independently used, or two or more types thereof may be used together.

—Polyvalent Carboxylic Acid—

The polyvalent carboxylic acid described above is not particularly limited, and can be suitably selected according to the object, and examples of the polyvalent carboxylic acid described above include divalent carboxylic acids and trivalent or higher carboxylic acids.

Examples of the divalent carboxylic acids described above include saturated aliphatic dicarboxylic acids such as oxalic acid, succinic acid, glutaric acid, adipic acid, suberic acid, azelaic acid, sebacic acid, 1,9-nonane dicarboxylic acid, 1,10-decane dicarboxylic acid, 1,12-dodecane dicarboxylic acid, 1,14-tetradecane di carboxylic acid, and 1,18-octadecane dicarboxylic acid; aromatic dicarboxylic acids such as dibasic acids, for example, phthalic acid, isophthalic acid, terephthalic acid, naphthalene-2,6-dicarboxylic acid, malonic acid, and mesaconic acid; and anhydrides thereof or lower (the number of carbon atoms of 1 to 3) alkyl esters thereof.

Examples of the trivalent or higher carboxylic acids described above include 1,2,4-benzene tricarboxylic acid, 1,2,5-benzene tricarboxylic acid, 1,2,4-naphthalene tricarboxylic acid, and anhydrides thereof or lower (the number of carbon atoms of 1 to 3) alkyl esters thereof.

A dicarboxylic acid having a sulfonic acid group may be contained as the polyvalent carboxylic acid described above, in addition to the saturated aliphatic dicarboxylic acid or aromatic dicarboxylic acid described above. A dicarboxylic acid having a double bond may be contained in addition to the saturated aliphatic dicarboxylic acid or aromatic dicarboxylic acid described above. Only one type of such dicarboxylic acids may be independently used, or two or more types thereof may be used together.

It is preferable that the crystalline polyester resin described above comprises a straight chain saturated aliphatic dicarboxylic acid having carbon atoms of greater than or equal to 4 and less than or equal to 12, and a straight chain saturated aliphatic diol having carbon atoms of greater than or equal to 2 and less than or equal to 12. That is, it is preferable that the crystalline polyester resin described above has a constituent unit derived from a saturated aliphatic dicarboxylic acid having carbon atoms of greater than or equal to 4 and less than or equal to 12, and a constituent unit derived from saturated aliphatic diol having carbon atoms of greater than or equal to 2 and less than or equal to 12. Accordingly, the crystallinity is high, and the sharp melting properties are excellent, and thus, it is preferable from the viewpoint of enabling excellent low temperature fixing properties to be exhibited.

A melting point of the crystalline polyester resin is not particularly limited, and can be suitably selected according to the object, but is preferably higher than or equal to 60° C. and lower than or equal to 80° C. In a case where the melting point is lower than 60° C., the crystalline polyester resin is easily melted at a low temperature, and the heat resistant preservability of the toner decreases, and in a case where the melting point is higher than 80° C., the crystalline polyester resin is insufficiently melted by heating at the time of fixing the toner, and the low temperature fixing properties decrease.

A molecular weight of the crystalline polyester resin is not particularly limited, and can be suitably selected according to the object. In GPC measurement, it is preferable that ortho-dichlorobenzene solubles of the crystalline polyester resin have a weight average molecular weight (Mw) of 3,000 to 30,000, a number average molecular weight (Mn) of 1,000 to 10,000, and Mw/Mn of 1.0 to 10, from the viewpoint that a crystalline polyester resin having a sharp molecular weight distribution and a low molecular weight has excellent low temperature fixing properties, and in a case there is a lot of components having a low molecular weight, the heat resistant preservability decreases. It is more preferable that the weight average molecular weight (Mw) is 5,000 to 15,000, the number average molecular weight (Mn) is 2,000 to 10,000, and Mw/Mn is 1.0 to 5.0.

An acid value of the crystalline polyester resin is not particularly limited, and can be suitably selected according to the object, but in order to attain desired low temperature fixing properties, the acid value is preferably greater than or equal to 5 mgKOH/g, and is more preferably greater than or equal to 10 mgKOH/g, from the viewpoint of affinity between the paper and the resin. On the other hand, in order to improve high temperature offset-resistant properties, it is preferable that the acid value is less than or equal to 45 mgKOH/g.

A hydroxyl value of the crystalline polyester resin is not particularly limited, and can be suitably selected according to the object, but in order to attain desired low temperature fixing properties and to attain excellent charging characteristics, the hydroxyl value is preferably 0 mgKOH/g to 50 mgKOH/g, and is more preferably 5 mgKOH/g to 50 mgKOH/g.

A molecular structure of the crystalline polyester resin can be confirmed by X-ray diffraction, GC/MS, LC/MS, IR measurement, and the like, in addition to NMR measurement in a solution or a solid. Simply, a method of detecting a component having absorption based on $\delta CH$ (out-of-plane bending vibration) of olefin at $965 \pm 10$ $cm^{-1}$ or $990 \pm 10$ $cm^{-1}$ in an infrared absorption spectrum, as a crystalline polyester resin, is used.

The content of the crystalline polyester resin is not particularly limited, and can be suitably selected according to the object, but is preferably 1 part by mass to 10 parts by mass, and is more preferably 2 parts by mass to 4 parts by mass, with respect to 100 parts by mass of the toner. In a case where the content is less than 1 part by mass, the sharp melting due to the crystalline polyester resin is insufficient, and thus, the low temperature fixing properties are degraded, and in a case where the content is greater than 10 parts by mass, the heat resistant preservability decreases, and image fog easily occurs. In a case where the content is in the range which is more preferable, it is advantageous from the viewpoint of high image quality, and excellent low temperature fixing properties.

<Other Components>

Other components such as a release agent, a colorant, a charging control agent, an external additive, a fluidity improver, a cleanability improver, and a magnetic material can be added to the toner of the present disclosure, in addition to the components described above, if necessary.

—Release Agent—

The release agent is not particularly limited, and can be suitably selected from known release agents.

Examples of the release agent of waxes include natural waxes such as plant-based waxes such as carnauba wax, cotton wax, tree wax, and rice wax; animal-based waxes such as beeswax and lanolin; mineral-based waxes such as ozokerite and ceresin; and petroleum waxes such as paraffin, microcrystalline, and petrolatum.

Examples of the release agent further include; synthetic hydrocarbon waxes such as Fischer Tropsch wax, polyethylene, and polypropylene; and synthetic waxes such as ester, ketone, and ether, in addition to the above natural waxes.

An aliphatic acid amide-based compound such as 12-hydroxystearic acid amide, stearic acid amide, phthalic anhydride imide, and chlorinated hydrocarbon; a homopolymer or a copolymer of polyacrylate such as poly-n-stearyl methacrylate and poly-n-lauryl methacrylate, which are a crystalline polymer resin having a low molecular weight (e.g., a copolymer of n-stearyl acrylate and ethyl methacrylate); and a crystalline polymer having a long alkyl group on a side chain may also be used.

Among them, hydrocarbon-based waxes such as paraffin wax, microcrystalline wax, Fischer Tropsch wax, polyethylene wax, and polypropylene wax are preferable.

A melting point of the release agent is not particularly limited, and can be suitably selected according to the object, but is preferably 60° C. to 80° C. In a case where the melting point is lower than 60° C., there is a case where the release agent is easily melted at a low temperature, and the heat resistant preservability is degraded. On the other hand, in a case where the melting point is higher than 80° C., fixing offset occurs while the release agent is not sufficiently melted, and thus, a defect occurs in an image, even in a case where the resin is melted and is in a fixing temperature region.

The content of the release agent is not particularly limited, and can be suitably selected according to the object, but is preferably 2 parts by mass to 10 parts by mass, and is more preferably 3 parts by mass to 8 parts by mass, with respect to 100 parts by mass of the toner. In a case where the content is less than 2 parts by mass, the high temperature offset-resistant properties and the low temperature fixing properties at the time of fixing the toner are degraded, and in a case where the content is greater than 10 parts by mass, the heat resistant preservability decreases, or image fog or the like easily occurs. In a case where the content is in the range which is more preferable, it is advantageous from the viewpoint of high image quality and of improving fixing stability.

—Colorant—

The colorant is not particularly limited, and can be suitably selected according to the object.

Examples of the colorant include carbon black, nigrosine dye, iron black, naphthol yellow S, Hansa yellow (10G, 5G and G), cadmium yellow, yellow iron oxide, Chinese yellow, chromium yellow, titanium yellow, polyazo yellow, oil yellow, Hansa yellow (GR, A, RN, and R), pigment yellow L, benzidine yellow (G and GR), permanent yellow (NCG), Balkan fast yellow (5G and R), tartrazine lake, quinoline yellow lake, anthrazane yellow BGL, isoindolinone yellow, red iron oxide, lead red, lead vermilion, cadmium red, cadmium mercury red, antimony vermilion, permanent red 4R, para red, fire red, parachloroorthonitroaniline red, Lithol fast scarlet brilliant fast scarlet, brilliant carmine BS, permanent red (F2R, F4R, FRL, FRLL, and F4RH), fast scarlet VD, Vulcan fast rubine B, brilliant scarlet Lithol rubine GX, permanent red F5R, brilliant carmine 6B, pigment scarlet 3B, Bordeaux 5B, toluidine maroon, permanent Bordeaux F2K, Helio Bordeaux BL, Bordeaux 10B, Bon maroon light, Bon maroon medium, eosin lake, rhodamine lake B, rhodamine lake Y, alizarin lake, thioindigo red B, thioindigo maroon, oil red, quinacridone red, pyrazolone red, polyazo red, chromium vermillion, benzidine orange, perinone orange, oil orange, cobalt blue, cerulean blue, alkali blue lake, peacock blue lake, Victoria blue lake, non-metal phthalocyanine blue, phthalocyanine blue, fast sky blue, indanthrene blue (RS and BC), indigo, ultramarine blue, iron blue, anthraquinone blue, fast violet B, methyl violet lake, cobalt purple, manganese purple, dioxane violet, anthraquinone violet, chromium green, zinc green, chromium oxide, viridian, emerald green, pigment green B, naphthol green B, green gold, acid green lake, malachite green lake, phthalocyanine green, anthraquinone green, titanium oxide, zinc flower, and Lithopone.

The content of the colorant is not particularly limited, and can be suitably selected according to the object, but is preferably 1 parts by mass to 15 parts by mass, and is more preferably 3 parts by mass to 10 parts by mass, with respect to 100 parts by mass of the toner.

The colorant can be used as a masterbatch composite with a resin. Examples of a resin to be used for producing the masterbatch include a polymer of styrene or a substitute thereof, such as polystyrene, poly-p-chlorostyrene, and polyvinyl toluene; a styrene-based copolymer such as a styrene-p-chlorostyrene copolymer, a styrene-propylene copolymer, a styrene-vinyl toluene copolymer, a styrene-vinyl naphthalene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-methyl-α-chloromethacrylate copolymer, a styrene-acrylonitrile copolymer, a styrene-vinyl methyl ketone copolymer, a styrene-butadiene copolymer, a styrene-isoprene copolymer, a styrene-acrylonitrile-indene copolymer, a styrene-maleic acid copolymer, and a styrene-maleic acid ester copolymer; polymethyl methacrylate, polybutyl methacrylate, polyvinyl chloride, polyvinyl acetate, polyethylene, polypropylene, polyester, an epoxy resin, an epoxy polyol resin, polyurethane, polyamide, polyvinyl butyral, a polyacrylate resin, rosin, a modified rosin, a terpene resin, an aliphatic or alicyclic hydrocarbon resin, an aromatic-based petroleum resin, chlorination paraffin, and paraffin wax, in addition to the polyester resin described above.

Only one type of such resins may be independently used, or two or more types thereof may be used together.

The masterbatch can be obtained by mixing a resin for a masterbatch and a colorant together with a high shear force, and kneading the resin and the colorant. At this time, in order to increase a mutual interaction between the colorant and the resin, an organic solvent can be used. In a method called flushing method mixing and kneading an aqueous paste of the colorant containing water along with the resin and the organic solvent, moving the colorant to the resin side, and removing the moisture and the organic solvent component, a wet cake of the colorant can be used as it is, and thus, the flushing method is preferable since drying is not required. In the mixing and kneading, a high shear dispersion device such as a triple roll mill is preferably used.

—Charging Control Agent—

The charging control agent is not particularly limited, and can be suitably selected according to the object. Examples of the charging control agent include a nigrosine-based dye, a triphenylmethane-based dye, a chromium-containing metal complex dye, a molybdenum acid chelate pigment, a rhodamine-based dye, an alkoxy-based amine, a quaternary ammonium salt (including a fluorine modified quaternary ammonium salt), alkyl amide, a single body or a compound of phosphorus, a single body or a compound of tungsten, a fluorine-based activator, a metal salt of a salicylic acid, and a metal salt of a salicylic acid derivative.

Specific examples thereof include: BON IRON 03 of a nigrosine-based dye, BONIRON P-51 of a quaternary ammonium salt, BONTRON S-34 of a metal-containing azo dye, E-82 of an oxynaphthoic acid-based metal complex, E-84 of a salicylic acid-based metal complex, and E-89 of a phenol-based condensate (all are manufactured by ORIENT CHEMICAL INDUS FRIES CO., LTD.); TP-302 and TP-415 of a quaternary ammonium salt molybdenum complex (all are manufactured by HODOGAYA CHEMICAL CO., LTD.); LRA-901, LR-147 which is a boron complex (manufactured by Japan Carlit Co., Ltd.); and copper phthalocyanine, perylene, quinacridone, an azo pigment, and a polymer-based compound having a functional group such as a sulfonic acid group, a carboxyl group, and a quaternary ammonium salt.

The content of the charging control agent is not particularly limited, and can be suitably selected according to the object, but is preferably 0.1 parts by mass to 10 parts by mass, and is more preferably 0.2 parts by mass to 5 parts by mass, with respect to 100 parts by mass of the toner. In a case where the content is greater than 10 parts by mass, charging properties of the toner excessively increase, a main effect of the charging control agent is reduced, and an electrostatic attraction force with respect to a developing roller increases, and thus, fluidity of a developer may decrease or an image density may decrease. The charging control agent can be subjected to dissolution dispersion after being melted and kneaded along with the masterbatch and/or the resin, may be directly dissolved in an organic solvent, may be added at the time of dispersion, or may be secured after toner particles are prepared on the toner surface.

—External Additive—

The external additive is not particularly limited, and can be suitably selected according to the object. Examples of the external additive include various inorganic fine particles and hydrophobized inorganic fine particles. A metal salt of aliphatic acid (e.g., zinc stearate and aluminum stearate), or a fluoropolymer can also be used.

Examples of the inorganic fine particles include silica, alumina, titanium oxide, barium titanate, magnesium titanate, calcium titanate, strontium titanate, iron oxide, copper oxide, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride. Among them, silica and titanium dioxide are particular preferable.

Examples of a desired additive include silica fine particles, titania fine particles, titanium oxide fine particles, and alumina fine particles, which are subjected to a hydrophobic treatment. Examples of the silica fine particles include R972, R974, RX200, RY200, R202, R805, and R812 (all are manufactured by NIPPON AEROSIL CO., LTD.). Examples of the titania fine particles include P-25 (manufactured by NIPPON AEROSIL CO., LTD.), STT-30 and STT-65C-S (all are manufactured by Titan Kogyo, Ltd.), TAF-140 (manufactured by Fuji Titanium Industry Co., Ltd.), MT-150W, MT-500B, MT-600B, and MT-150A (all are manufactured by TAYCA CORPORATION).

Examples of the titanium oxide fine particles subjected to the hydrophobic treatment include T-805 (manufactured by NIPPON AEROSIL CO., LTD.); STT-30A and STT-65S-S (all are manufactured by Titan Kogyo, Ltd.); TAF-500T and TAF-1500T (all are manufactured by Fuji Titanium Industry Co., Ltd.); MT-100S and MT-100T (all are manufactured by TAYCA CORPORATION); and IT-S (manufactured by ISHIHARA SANGYO KAISHA, LTD.).

The oxide fine particles subjected to the hydrophobic treatment, the silica fine particles subjected to the hydrophobic treatment, the titania fine particles subjected to the hydrophobic treatment, and the alumina fine particles subjected to the hydrophobic treatment can be obtained by treating hydrophilic fine particles with a silane coupling agent such as methyl trimethoxysilane, methyl triethoxysilane, and octyl trimethoxysilane. Silicone oil-treated oxide fine particles in which silicone oil is used for a treatment by being heated if necessary, and inorganic fine particles are also preferable.

Examples of the silicone oil described above include dimethyl silicone oil, methyl phenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, methacryl-modified silicone oil, and α-methyl styrene-modified silicone oil.

An average particle diameter of primary particles of the inorganic fine particles is not particularly limited, and can be suitably selected according to the object, but is preferably less than or equal to 100 nm, and is more preferably 3 nm to 70 nm. In a case where the average particle diameter is less than 3 nm, inorganic fine particles are embedded in the toner, and thus, the function thereof is hardly effectively exhibited. In a case where the average particle diameter is greater than 100 nm, a photoconductor surface is unevenly damaged, which is not preferable.

An average particle diameter of primary particles of the hydrophobized inorganic fine particles is preferably 1 nm to 100 nm, and is more preferably 5 nm to 70 nm. It is preferable to contain at least one type of inorganic fine particles having the average particle diameter of the primary particles of less than or equal to 20 nm and at least one type of inorganic fine particles having the average particle diameter of the primary particles of greater than or equal to 30 nm. It is preferable that a specific surface area obtained by a BET method is 20 $m^2/g$ to 500 $m^2/g$.

The content of the external additive is not particularly limited, and can be suitably selected according to the object, but is preferably 0.1 parts by mass to 5 parts by mass, and is more preferably 0.3 parts by mass to 3 parts by mass, with respect to 100 parts by mass of the toner.

—Fluidity Improver—

The fluidity improver is not particularly limited insofar as hydrophobicity is improved and flow characteristics or charging characteristics can be prevented from being degraded under high humidity by a surface treatment thereof, and can be suitably selected according to the object. Examples of the fluidity improver include a silane coupling agent, a silylation agent, a silane coupling agent having an alkyl fluoride group, an organic titanate-based coupling agent, an aluminum-based coupling agent, silicone oil, and modified silicone oil. It is particularly preferable that silica or titanium oxide described above is subjected to a surface treatment with such a fluidity improver, and thus, is used as hydrophobic silica and hydrophobic titanium oxide.

—Cleanability Improver—

The cleanability improver is added to the toner to remove a developer remaining on a photoconductor or a primary transfer medium after image transfer, is not particularly limited, and can be suitably selected according to the object. Examples of the cleanability improver include a metal salt of aliphatic acid such as zinc stearate, calcium stearate, and stearic acid, and polymer fine particles produced by soap-free emulsion polymerization, such as polymethyl methacrylate fine particles and polystyrene fine particles. It is preferable that a particle size distribution of the polymer fine particles is comparatively narrow, and it is preferable that a volume average particle diameter is 0.01 μm to 1 μm.

—Magnetic Material—

The magnetic material is not particularly limited, and can be suitably selected according to the object, and examples of the magnetic material include an iron powder, magnetite, and ferrite. Among them, it is preferable that the magnetic material is white from the viewpoint of a color tone.

<Glass Transition Temperature (Tg1st)>

A glass transition temperature (Tg1st) at first temperature rising of differential scanning calorimetry (DSC) of the toner of the present disclosure is 45° C. to 65° C., and is preferably 50° C. to 60° C. In a case where Tg is lower than 45° C., toner aggregation easily occurs due to a temperature change at the time of transporting or storing the toner in summer or a tropical region. As a result, toner solidification in a toner bottle, and toner adhesion in the developing machine occur. A feeding defect due to toner clogging in the toner bottle, and an image abnormality due to the toner adhesion in the developing machine easily occur. In a case where Tg is higher than 65° C., excellent low temperature fixing properties may not be obtained.

By varying the constituent ratio between the aliphatic diol and the dicarboxylic acid component in the polyester resin component A, the glass transition temperature of the polyester resin component B, the glass transition temperature of the polyester resin component C, and the constituent ratio of the polyester resin component A, the polyester resin component B, and the polyester resin component C, the glass transition temperature (Tg1 st) at the first temperature rising of DSC of the toner of the present disclosure can be adjusted to be in a desired range.

<Volume Average Particle Diameter>

The volume average particle diameter of the toner of the present disclosure is not particularly limited, and can be suitably selected according to the object, but is preferably 3 μm to 7 μm. It is preferable that a ratio of the volume average particle diameter to a number average particle diameter is less than or equal to 1.2. It is preferable that 1 number % to 10 number % of the toner has a volume average particle diameter of less than or equal to 2 μm.

<Calculation Method and Analysis Method of Various Characteristics of Toner and Toner Structural Component>

Next, a calculation method and an analysis method of various characteristics of the toner and a toner structural component will be described. The glass transition temperature Tg, the acid value, the hydroxyl value, the molecular weight, and the melting point of the toner structural components such as the polyester resin components A, B, and C, the crystalline polyester resin component, and the release agent may be respectively measured with respect to the single body itself, or may be measured with respect to each component which is separated from the actual toner by using soxhlet extraction, gel permeation chromatography (GPC), or the like. In the present disclosure, means separating the toner structural component in the toner can be arbitrarily selected, but a glass transition temperature Tg of a target sample is measured by the following method.

First, an example will be described. An example of a method of measuring the glass transition temperatures of the polyester resin component A, the polyester resin component B, and the polyester resin component C in the toner will be described. First, 1 g of the toner is put into 100 mL of THF, and is subjected to soxhlet extraction, and thus, THF solubles and THF insolubles are obtained. The THF solubles and the THF insolubles are dried by a vacuum drier for 24 hours, and thus, a mixture of the polyester resin component C and the crystalline polyester resin component is obtained from the THF solubles, and a mixture of the polyester resin component A and the polyester resin component B is obtained from the THF insolubles. The mixtures are set to a target sample, and the glass transition temperature is measured by the following method.

Since the glass transition temperatures of the polyester resin component A and the polyester resin component B are different, by measuring the glass transition temperature of the above-obtained mixture of the polyester resin component A and the polyester resin component B, the glass transition temperatures of the polyester resin component A and the polyester resin component B can be obtained.

Next, another example will be described. First, 1 g of the toner is put into 100 mL of THF, and is stirred for 30 minutes under a condition at 25° C., and thus, a dissolution liquid is obtained in which solubles are dissolved. The dissolution liquid is filtered by a membrane filter having a mesh opening of 0.2 μm, and thus, THF solubles in the toner are obtained. Next, the THF solubles are dissolved in THF, and thus, a sample for GPC measurement is obtained. The sample is injected into GPC for measuring the molecular weight of the polyester resin component C. THF insolubles in the toner are set to a sample for GPC measurement, as a sample for measuring the polyester resin component A and the polyester resin component B.

On the other hand, a fraction collector is disposed on an eluate outlet of GPC, and an eluate is collected for each predetermined count, and thus, an eluate is obtained at each area ratio of 5% from an elution initiation of an elution curve (an initial rise of the curve). Next, 30 mg of each fraction of the eluate is dissolved 1 mL of heavy chloroform, and 0.05 volume % of tetramethyl silane (TMS) is added as a standard substance. The solution is filled in a glass tube for NMR measurement having a diameter of 5 mm, and is integrated 128 times by using a nuclear magnetic resonance device (JNM-AL400, manufactured by JEOL Ltd.) at 23° C. to 25° C., and thus, a spectrum is obtained. A monomer composition and a constituent ratio of the polyester resin components A, B, and C, and crystalline polyester resin in the toner can be obtained from a peak integral ratio of the obtained spectrum.

Next, an example of separating each of the components by GPC will be described. In GPC measurement using THF as a mobile phase, an eluate is collected by a fraction collector or the like, and fractions corresponding to a desired molecular weight portion of the overall integral of the elution curve are collected. Next, the collected fractions of the eluate are concentrated and dried by an evaporator or the like, and then, a solid content is dissolved in a heavy solvent such as heavy chloroform or heavy THF, and is subjected to 1H-NMR. measurement, and thus, a constituent monomer ratio of a resin in an elution component is calculated from an integral ratio of each element. In another method, an eluate may be concentrated, and then, may be subjected to hydrolysis with sodium hydroxide or the like, and a decomposition product may be subjected to qualitative and quantitative analysis by high-speed liquid chromatography (HPLC), and thus, a constituent monomer ratio may be calculated.

In a case where toner base particles are formed while generating a polyester resin by at least one of an extension reaction and a cross-linking reaction between a non-linear reactive precursor and a curing agent, the polyester resin may be separated from the actual toner by using GPC or the like, to measure Tg or the like thereof. Alternatively, a single body of the polyester resin may be synthesized by at least one of the extension reaction and the cross-linking reaction between the non-linear reactive precursor and the curing agent, to measure Tg or the like from the synthesized polyester resin.

<<Measurement Method of Melting Point and Glass Transition Temperature Tg>>

The melting point and the glass transition temperature Tg of the present disclosure are measured by using a DSC system (a differential scanning calorimeter) ("Q-200", manufactured by TA Instruments Japan Inc.).

Specifically, a melting point and a glass transition temperature of a target sample are measured by the following sequence.

First, approximately 5.0 mg of the target sample is put into an aluminum sample container, and the sample container is put on a holder unit, and is set in an electric furnace. Next, heating is performed at a temperature raising rate of 1.0° C./min from −80° C. up to 150° C. (the first temperature rising), under a nitrogen atmosphere. After that, cooling is performed at a temperature dropping rate of 1.0° C./min from 150° C. up to −80° C., and heating is performed at a temperature raising rate of 1.0° C./min up to 150° C. (the second temperature rising). In each of the first temperature rising and the second temperature rising, a DSC curve is measured by using a differential scanning calorimeter ("Q-200", manufactured by TA Instruments Japan Inc.).

From the obtained DSC curves, a DSC curve at the first temperature rising can be selected by using an analysis program in a Q-200 system to determine the glass transition temperature Tg1st at the first temperature rising of the target sample. Similarly, a DSC curve at the second temperature rising can be selected to determine the glass transition temperature Tg2nd at the second temperature rising of the target sample.

In the present disclosure, an onset value illustrated in FIG. 1 is calculated as Tg. The obtained DSC curve is analyzed by the analysis program in the Q-200 system to determine the onset value illustrated in FIG. 1, and the onset value is set to Tg of the present disclosure.

In measuring the component insoluble in THF of the toner, temperature rising amplitude is performed by applying a modulation temperature amplitude as described below, so that the glass transition temperature (Tg1st) of the first temperature rising is separated to two points.

(Measurement Condition)

Heating is performed at a temperature raising rate of 1.0° C./min from −80° C. up to 150° C. (first temperature rising), while applying a modulation temperature amplitude of ±1.0° C./minute by using a modulation mode. The obtained DSC curve is analyzed by the analysis program in the Q-200 system while setting "Reversing Heat Flow" to a vertical axis to determine the onset value illustrated in FIG. 1, and the onset value is set to Tg.

From the obtained DSC curves, a DSC curve at the first temperature rising can be selected by using the analysis program in the Q-200 system to determine an endothermic peak top temperature at the first temperature rising as a melting point of the target sample. Similarly, a DSC curve at the second temperature rising can be selected to determine an endothermic peak top temperature at the second temperature rising as a melting point of the target sample.

In the present disclosure, the melting points and the glass transition temperatures Tg of the polyester resin components A, B, and C, and the other structural components such as the release agent are, unless otherwise particularly noted, the endothermic peak top temperatures at the second temperature rising and the glass transition temperatures Tg2nd, respectively.

<Mass Ratio of Polyester Resin Component>

In the present disclosure, when a mass ratio of the polyester resin component A is set to a, and a mass ratio of the polyester resin component B is set to b, and a mass ratio of the polyester resin component C is set to c, with respect to the total mass of the polyester resin component A, the polyester resin component B, and the polyester resin component C, it is preferable that $$4(a+b)<c$$

is satisfied. In such a case, the resin components can be prevented from being separated, and a dispersion defect of the pigment or a decrease in the degree of coloring can be prevented. An excellent image can be obtained, and the fixing region •preservability can be ensured.

In the present disclosure, as described above, the mass ratio of each polyester resin component can be obtained from the weight of a combined substance of the polyester resin components A and B or a combined substance of the polyester resin component C and the crystalline polyester resin, obtained by soxhlet extraction, GPC, or the like, of the toner.

<Method for Producing Toner>

The method for producing the toner is not particularly limited, and can be suitably selected according to the object, but it is preferable that the toner is granulated by a process in which an oil phase containing the above polyester resin components A, B, and C, and if necessary, the crystalline polyester resin, the release agent, the colorant, and the like is dispersed in an aqueous medium.

It is more preferable that the toner is granulated by a process in which an oil phase containing a polyester resin having at least one of a urethane bond and a urea bond, which is a prepolymer, as the polyester resin components A and B, and a polyester resin having no urethane bond and no urea bond, preferably along with the crystalline polyester resin, and if necessary, the curing agent, the release agent, the colorant, and the like, is dispersed in an aqueous medium.

Examples of such a method for producing the toner include a known dissolution suspension method.

Examples of the dissolution suspension method include a method for forming the toner base particles while generating a polyester resin by at least one of an extension reaction and a cross-linking reaction between the prepolymer and the curing agent.

In the method, preparation of the aqueous medium, preparation of the oil phase containing the toner materials, emulsification or dispersion of the toner materials, and removal of the organic solvent are performed.

—Preparation of Aqueous Medium (Water Phase)—

The preparation of the aqueous medium can be performed by dispersing the resin particles in the aqueous medium. An added amount of the resin particles in the aqueous medium is not particularly limited, and can be suitably selected according to the object, but is preferably 0.5 parts by mass to 10 parts by mass with respect to 100 parts by mass of the aqueous medium.

The aqueous medium is not particularly limited, and can be suitably selected according to the object, and examples of the aqueous medium include water, a solvent mixable with water, and a mixture thereof. Only one type of such aqueous media may be independently used, or two or more types thereof may be used together. Among them, water is preferable.

The solvent mixable with water is not particularly limited, and can be suitably selected according to the object, and examples of the solvent include alcohols, dimethyl formamide, tetrahydrofuran, cellosolves, and lower ketones. Examples of the alcohols described above include methanol, isopropanol, and ethylene glycol. Examples of lower ketones described above include acetone, methyl ethyl ketone, and the like.

—Preparation of Oil Phase—

The preparation of the oil phase containing the toner materials can be performed by dissolving or dispersing, in the organic solvent, the toner materials containing the polyester resins A and B having at least one of a urethane bond and a urea bond, which are a prepolymer, and the polyester resin C having no urethane bond and no urea bond, and if necessary, the crystalline polyester resin, the curing agent, the release agent, the colorant, and the like.

The organic solvent is not particularly limited, and can be suitably selected according to the object, but an organic solvent having a boiling point of lower than 150° C. is preferable because of being easily removed.

Examples of the organic solvent having a boiling point of less than 150° C. include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone.

Only one type of such organic solvents may be independently used, or two or more types thereof may be used together.

Among them, ethyl acetate, toluene, xylene, benzene, methylene chloride, 1,2-dichloroethane, chloroform, and carbon tetrachloride are preferable, and ethyl acetate is more preferable.

—Emulsification or Dispersion—

The emulsification or the dispersion of the toner materials can be performed by dispersing the oil phase containing the toner materials in the aqueous medium. When the toner materials are subjected to the emulsification or the dispersion, the curing agent and the prepolymer can be subjected to at least one of an extension reaction and a cross-linking reaction.

Reaction conditions (e.g., reaction time and reaction temperature) for generating the prepolymer are not particularly limited, and can be suitably selected according to a combination of the curing agent and the prepolymer. The reaction time is preferably 10 minutes to 40 hours, and is more preferably 2 hours to 24 hours. The reaction temperature is preferably 0° C. to 150° C., and is more preferably 40° C. to 98° C.

A method for dispersing the prepolymer in the aqueous medium for stably forming a dispersion liquid containing the prepolymer is not particularly limited, and can be suitably selected according to the object. Examples of the method include adding the oil phase, that is prepared by dissolving or dispersing the toner materials in the solvent, into an aqueous medium phase, and performing dispersion by a shear force.

A disperser used for the dispersion is not particularly limited, and can be suitably selected according to the object. Examples of the disperser include a low-speed shear type disperser, a high-speed shear type disperser, a friction type disperser, a high-pressure jet type disperser, and an ultrasonic disperser. Among them, the high-speed shear type disperser is preferable for enabling a particle diameter of a dispersion element (an oil droplet) to be controlled such that the particle diameter is 2 μm to 20 μm.

In the case of using the high-speed shear type disperser, conditions such as the number of rotations, dispersion time, and dispersion temperature can be suitably selected according to the object. The number of rotations is preferably 1,000 rpm to 30,000 rpm, and is more preferably 5,000 rpm to 20,000 rpm. In the case of a batch system, it is preferable that the dispersion time is 0.1 minutes to 5 minutes. The dispersion temperature is preferably 0° C. to 150° C., and is more preferably 40° C. to 98° C., under pressure. In general, the dispersion is easily performed as the dispersion temperature increases.

A used amount of the aqueous medium at the time of emulsifying or dispersing the toner materials is not particularly limited, and can be suitably selected according to the object, but is preferably 50 parts by mass to 2,000 parts by mass, and is more preferably 100 parts by mass to 1,000 parts by mass, with respect to 100 parts by mass of the toner material. In a case where the used amount of the aqueous medium is less than 50 parts by mass, a dispersion state of the toner materials is degraded, and thus, the toner base particles having a predetermined particle diameter cannot be obtained, and in a case where the used amount of the aqueous medium is greater than 2,000 parts by mass, a production cost increases.

When the oil phase containing the toner materials is emulsified or dispersed, it is preferable to use a dispersing agent, for stabilizing the dispersion element such as an oil droplet and obtaining a desired shape and a sharp particle size distribution.

The dispersing agent is not particularly limited, and can be suitably selected according to the object, and examples of the dispersing agent include a surfactant, a poorly water-soluble inorganic compound dispersing agent, and a polymer-based protective colloid. Only one type of such dispersing agents may be independently used, or two or more types thereof may be used together. Among them, the surfactant is preferable.

The surfactant is not particularly limited, and can be suitably selected according to the object, and for example, an anionic surfactant, a cationic surfactant, a non-ionic surfactant, or an ampholytic surfactant can be used. Examples of the anionic surfactant include alkyl benzene sulfonate, α-olefin sulfonate, and ester phosphate. Among them, an anionic surfactant having a fluoroalkyl group is preferable.

—Removal of Organic Solvent—

A method of removing the organic solvent from the dispersion liquid such as emulsification slurry is not particularly limited, and can be suitably selected according to the object. Examples of the method include a method of gradually increasing the temperature of the entire reaction system and evaporating the organic solvent in the oil droplet, and a method of spraying the dispersion liquid in a drying environment and removing the organic solvent in the oil droplet.

As the organic solvent is removed, the toner base particles are formed. The toner base particles can be washed or dried, and further can be classified. The classification may be performed in a liquid by removing a fine particle portion with a cyclone, a decanter, centrifugal separation, and the like, or may be performed after drying.

The toner base particles obtained as described above may be mixed with particles of the external additive, the charging control agent, or the like. At this time, it is possible to prevent the particles of the external additive or the like from being detached from the surface of the toner base particles by applying a mechanical impulsive force.

A method for applying the mechanical impulsive force is not particularly limited, and can be suitably selected according to the object. Examples of the method include a method of applying an impulsive force to the mixture by using a blade which is rotated at a high speed, and a method of putting the mixture into a high-speed airstream, increasing the speed, and allowing the particles to be collided with each other or the particles to be collided with a suitable collision plate.

A device used in the method described above is not particularly limited, and can be suitably selected according to the object. Examples of the device include ONG MILL (manufactured by HOSOKAWA MICRON CORPORATION), a device in which I-type mill (manufactured by Nippon Pneumatic Mfg. Co., Ltd.) is modified such that a grinding air pressure decreases, a hybridization system (manufactured by Nara Machinery Co., Ltd.), a cryptron system (manufactured by Kawasaki Heavy Industries), and an automatic mortar.

(Developer)

The developer of the present disclosure contains at least the toner of the present disclosure, and if necessary, other components which can be suitably selected, such as a carrier. Therefore, excellent transfer properties and excellent charging properties can be obtained, and thus, an image can be stably formed with a high image quality. The developer may be a one-component developer or a two-component developer, and in the case of being used in a high-speed printer or the like responding to improvement in the recent information processing speed, the two-component developer is preferable since the lifetime is improved.

In a case where the developer is used as the one-component developer, even after the toner is consumed and supplied, a change in particle diameter of the toner is little, and the filming of the toner with respect to a developing roller or the fusion of the toner with respect to a member such as a blade which forms the toner to be a thin layer are unlikely to occur, and thus, excellent and stable developing properties and images can be obtained even in the case of stirring the toner in the developing device for a long period of time.

In a case where the developer is used as the two-component developer, even after the toner is consumed and supplied for a long period of time, a change in particle diameter of the toner is little, and thus, excellent and stable developing properties and images can be obtained even in the case of stirring the toner in the developing device for a long period of time.

<Carrier>

The carrier is not particularly limited, and can be suitably selected according to the object, but preferably includes a core material, and a resin layer covering the core material.

—Core Material—

The material of the core material is not particularly limited, and can be suitably selected according to the object, and examples of the material include manganese-strontium-based materials having a magnetization of 50 emu/g to 90 emu/g and manganese-magnesium-based materials having a magnetization of 50 emu/g to 90 emu/g. In order to ensure the image density, it is preferable to use a high-magnetized material such as an iron powder having a magnetization of greater than or equal to 100 emu/g and magnetite having a magnetization of 75 emu/g to 120 emu/g. It is preferable to use a low-magnetized material such as a copper-zinc-based material having a magnetization of 30 emu/g to 80 emu/g of, for relieving the impulsion of the developer, which is in an erect state, against the photoconductor, which is advantageous in terms of a high image quality.

Only one type of such materials may be independently used, or two or more types thereof may be used together.

A volume average particle diameter of the core material is not particularly limited, and can be suitably selected according to the object, but is preferably 10 μm to 150 μm, and is more preferably 40 μm to 100 μm. In a case where the volume average particle diameter is less than 10 μm, fine powder in the carrier increases in amount, magnetization per particle decreases, and thus, the carrier may scatter. By contrast, in a case where the volume average particle diameter is greater than 150 μm, the specific surface area decreases, and the toner may scatter, and thus, in particular, in a full color image having a large solid portion, the reproducibility of the solid portion worsens.

The toner of the present disclosure is mixed with the carrier to be used as a two-component-based developer.

The content of the carrier in the two-component developer is not particularly limited, and can be suitably selected according to the object, but is preferably 90 parts by mass to 98 parts by mass, and is more preferably 93 parts by mass to 97 parts by mass, with respect to 100 parts by mass of the two-component developer.

The developer of the present disclosure can be suitably used in various electrophotographic image forming methods such as a magnetic one-component developing method, non-magnetic one-component developing method, and a two-component developing method.

(Developer Container)

A developer container containing the developer of the present disclosure is not particularly limited, and can be suitably selected from known containers. Examples of the container include a container including a container main body and a cap.

The size, the shape, the structure, and the material of the container main body are not particularly limited, but it is preferable that the shape is a cylindrical shape. In particular, it is preferable that spiral-like concavities and convexities are formed on an inner circumferential surface, and the developer, which is the contents, can be moved to an outlet side by a rotation, and a part or all of the spiral-like concavities and convexities has a bellows function. It is preferable that the material has an excellent dimension accuracy. Examples of the material include resin materials such as a polyester resin, a polyethylene resin, a polypropylene resin, a polystyrene resin, a polyvinyl chloride resin, polyacrylate, a polycarbonate resin, ABS resin, and a polyacetal resin.

The developer container is easily preserved or conveyed, and has excellent handling properties, and thus, can be detachably attached to a process cartridge and an image forming device described below, and can be used for feeding the developer.

(Image Forming Device and Image Forming Method)

The image forming device of the present disclosure includes at least an electrostatic latent image bearer, an electrostatic latent image forming unit, and a developing unit, and if necessary, other units.

An image forming method according to the present disclosure includes at least an electrostatic latent image forming step and a developing step, and if necessary, other steps.

<Electrostatic Latent Image Bearer>

The material, the structure, and the size of the electrostatic latent image bearer are not particularly limited, and can be suitably selected from known electrostatic latent image bearers, and examples of the material include an inorganic photoconductor such as amorphous silicon and selenium, and an organic photoconductor such as polysilane and phthalopolymethine. Among them, amorphous silicon is preferable for its long lifetime.

It is preferable that a linear velocity of the electrostatic latent image bearer is greater than or equal to 300 mm/s.

<Electrostatic Latent Image Forming Unit and Electrostatic Latent Image Forming Step>

The electrostatic latent image forming unit is not particularly limited insofar as being a unit forming an electrostatic latent image on the electrostatic latent image bearer, and can be suitably selected according to the object. Examples of the electrostatic latent image forming unit include a unit including at least a charging member for charging the surface of the electrostatic latent image bearer, and an exposure member for exposing the surface of the electrostatic latent image bearer to light containing image information.

The electrostatic latent image forming step is not particularly limited insofar as being a step of forming an electrostatic latent image on the electrostatic latent image bearer, and can be suitably selected according to the object. The electrostatic latent image forming step can be performed by charging the surface of the electrostatic latent image bearer and exposing the charged surface to light containing image information, by using the electrostatic latent image forming unit.

<<Charging Member and Charging>>

The charging member is not particularly limited, and can be suitably selected according to the object, and examples of the charging member include a known contact charger containing a conductive or semi-conductive roller, a brush, a film, and/or a rubber blade, and a non-contact charger using a corona discharge such as corotron and scorotron.

The charging can be performed by applying a voltage to the surface of the electrostatic latent image bearer with the charging member.

The charging member may be in the shape of a roller, a magnetic brush, a fur brush, and can be selected according to the specification or the aspect of the image forming device.

The charging member is not limited to the contact charger, but it is preferable to use the contact charger because ozone generated from such a charging member is reduced in the image forming device.

<<Exposure Member and Exposure>>

The exposure member is not particularly limited insofar as the surface of the electrostatic latent image bearer having been charged by the charging member is exposed to light containing image information, and can be suitably selected according to the object. Examples of the exposure member include various exposure members such as a radiation optical system, a rod lens array system, a laser optical system, and a liquid crystal shutter optical system.

A light source used in the exposure member is not particularly limited, and can be suitably selected according to the object. Examples of the light source include general light emitting substances such as a fluorescent lamp, a tungsten lamp, a halogen lamp, a mercury-vapor lamp, a sodium-vapor lamp, a light emitting diode (LED), a semiconductor laser (LD), and an electroluminescence (EL).

In order to emit only light at a desired wavelength band, various filters such as a sharp cut filter, a bandpass filter, a near-infrared cut filter, a dichroic filter, an interference filter, and a color temperature conversion filter can be used.

The exposure can be performed by exposing the surface of the electrostatic latent image bearer to light containing image information with the exposure member.

In the present disclosure, the electrostatic latent image bearer may be exposed to light containing image information from a rear surface side of the electrostatic latent image bearer.

<Developing Unit and Developing Step>

The developing unit is not particularly limited insofar as being a developing unit containing a toner for developing the electrostatic latent image on the electrostatic latent image bearer into a toner image, which is a visible image, and can be suitably selected according to the object.

The developing step is not particularly limited insofar as being a step of developing the electrostatic latent image on the electrostatic latent image bearer with the toner into a toner image, which is a visible image, and can be suitably selected according to the object. The developing step can be performed by the developing unit.

A developing device including a stirrer for frictionally stirring the toner to charge the toner, and a rotatable developer bearer containing a magnetic field generating unit secured to the inside thereof, configured to bear a developer containing the toner on the surface, is preferable as the developing unit.

<Other Units and Other Steps>

Examples of other units include a transfer unit, a fixing unit, a cleaning unit, a destaticizing unit, a recycle unit, and a control unit.

Examples of other steps include a transfer step, a fixing step, a cleaning step, a destaticizing step, a recycle step, and a control step.

<<Transfer Unit and Transfer Step>>

The transfer unit is not particularly limited insofar as being a unit for transferring a visible image onto a recording medium, and can be suitably selected according to the object. It is preferable that the transfer unit includes a primary transfer unit for transferring the visible image onto an intermediate transfer body to form a composite transfer image, and a secondary transfer unit for transferring the composite transfer image onto the recording medium.

The transfer step is not particularly limited insofar as being a step of transferring the visible image onto the recording medium, and can be suitably selected according to the object. It is preferable that the visible image is primarily transferred onto the intermediate transfer body, and then, the visible image is secondarily transferred to the recording medium.

The transfer step can be performed by charging the photoconductor by a transfer charger to transfer the visible image, and can be performed by the transfer unit.

Here, in a case where the image to be secondarily transferred onto the recording medium is a color image formed of toners of a plurality of colors, the toner of each color may be sequentially superimposed on the intermediate transfer body by the transfer unit, to form a composite toner image on the intermediate transfer body, and the composite toner image on the intermediate transfer body is secondarily transferred onto the recording medium at once by an intermediate transfer unit.

The intermediate transfer body is not particularly limited, and according to the object, can be suitably selected from known transfer bodies. Examples of the intermediate transfer body include a transfer belt.

It is preferable that the transfer unit (e.g., the primary transfer unit and the secondary transfer unit) includes at least a transfer device for charging the toner image on the photoconductor to be separated to the recording medium side. Examples of the transfer device include a corona transfer device using corona discharge, a transfer belt, a transfer roller, a pressure transfer roller, and an adhesion transfer device.

Regular paper is representative as the recording medium, but is not particularly limited insofar as being capable of transferring an unfixed image being developed, and can be suitably selected according to the object. For example, a PET base for OHP can also be used as the recording medium.

<<Fixing Unit and Fixing Step>>

The fixing unit is not particularly limited insofar as being a unit for fixing the transfer image that is transferred onto the recording medium, and can be suitably selected according to the object. For example, a known heating pressurizing member is preferable. Examples of the heating pressurizing member include a combination of a heating roller and a pressurizing roller, a combination of a heating roller, a pressurizing roller, and an endless belt.

The fixing step is not particularly limited insofar as a step of fixing the visible image that is transferred onto the recording medium, and can be suitably selected according to the object. For example, the fixing step may be performed every time the toner image of each color is transferred onto the recording medium, or may be performed at one time at the time when the toner images of each color are laminated.

The fixing step can be performed by the fixing unit.

It is preferable that the heating of the heating pressurizing member is performed at 80° C. to 200° C.

In the present disclosure, according to the object, a known optical fixer may be used along with or instead of the fixing unit.

A surface pressure in the fixing step is not particularly limited, and can be suitably selected according to the object, but is preferably 10 N/cm$^2$ to 80 N/cm$^2$.

<<Cleaning Unit and Cleaning Step>>

The cleaning unit is not particularly limited insofar as being a unit for removing the toner remaining on the photoconductor, and can be suitably selected according to the object. Examples of the cleaning unit include a magnetic brush cleaner, an electrostatic brush cleaner, a magnetic roller cleaner, a blade cleaner, a brush cleaner, and a web cleaner.

The cleaning step is not particularly limited insofar as being a step of removing the toner remaining on the photoconductor, and can be suitably selected according to the object. For example, the cleaning step can be performed by the cleaning unit.

<<Destaticizing Unit and Destaticizing Step>>

The destaticizing unit is not particularly limited insofar as being a unit for applying a destaticizing bias to the photoconductor to be destaticized, and can be suitably selected according to the object, and examples of the destaticizing unit include a destaticizing lamp.

The destaticizing step is not particularly limited insofar as a step of applying a destaticizing bias to the photoconductor to be destaticized, and can be suitably selected according to the object, and for example, the destaticizing step can be performed by the destaticizing unit.

<<Recycle Unit and Recycle Step>>

The recycle unit is not particularly limited insofar as being a unit for allowing the developing device to recycle the toner removed in the cleaning step, and can be suitably selected according to the object. Examples of the recycle unit include a known conveyance unit.

The recycle step is not particularly limited insofar as being a step of allowing the developing device to recycle the toner removed in the cleaning step, and can be suitably selected according to the object. The recycle step can be performed by the recycle unit.

Next, one aspect of performing a method for forming an image by the image forming device of the present disclosure will be described with reference to FIG. 2. A printer is exemplified as the image forming device of this embodiment, but the image forming device is not particularly limited insofar as being capable of forming an image by using a toner, such as a copy machine, a fax machine, or a multifunction peripheral.

The image forming device includes a paper feeding section 210, a conveying section 220, an image forming section 230, a transfer section 240, and a fixer 250.

The paper feeding section 210 includes a paper feeding cassette 211 in which fed papers P are stacked, and a paper feeding roller 212 feeding the papers P stacked in the paper feeding cassette 211 one by one.

The conveying section 220 includes a roller 221 conveying the paper P which is fed by the paper feeding roller 212 to a direction of the transfer section 240, a pair of timing rollers 222 interposing a tip end portion of the paper P which is conveyed by the roller 221 in a standby state to send out the paper to the transfer section 240 at a predetermined timing, and a paper ejection roller 223 ejecting the paper P onto which a color toner image is fixed to a paper ejection tray 224.

The image forming section 230 includes an image forming unit Y forming an image by using a developer including a yellow toner, an image forming unit C forming an image by using a developer including a cyan toner, an image forming unit M forming an image by using a developer including a magenta toner, an image forming unit K forming an image by using a developer including a black toner, and an exposure device 233, at a predetermined interval, in the order from the left side to the right side in the drawing.

In the case of indicating an arbitrary image forming unit in the image forming units (Y, C, M, and K), the arbitrary image forming unit will be referred to as an image forming unit.

The developer includes a toner and a carrier. In four image forming units (Y, C, M, and K), only developers used in each of the image forming units are different from each other, and mechanical constituents are substantially identical to each other.

The transfer section 240 includes: a driving roller 241; a driven roller 242; an intermediate transfer belt 243 rotatable in a counterclockwise direction of the drawing, in accordance with the driving of the driving roller 241; primary transfer rollers 244Y, 244C, 244M, and 244K disposed to face respective photoconductor drums 231Y, 231C, 231M, and 231K with the intermediate transfer belt 243 interposed therebetween; and a secondary counter roller 245 and a secondary transfer roller 246 disposed to face each other in a transfer position of the toner image onto the paper, with the intermediate transfer belt 243 interposed therebetween.

The fixer 250 contains a heater, and includes a fixing belt 251 for heating the paper P and a pressurizing roller 252 that forms a nip by being rotatably pressurized against the fixing belt 251. Accordingly, heat and pressure are applied to the color toner image on the paper P, and thus, the color toner image is fixed. The paper P onto which the color toner image is fixed is ejected to the paper ejection tray 224 by the paper ejection roller 223, and a series of image forming processes is completed.

(Process Cartridge)

A process cartridge according to the present disclosure is molded to be detachably attachable to various image forming devices, and includes at least the electrostatic latent image bearer for bearing an electrostatic latent image and the developing unit for developing the electrostatic latent image born on the electrostatic latent image bearer with the developer of the present disclosure to form a toner image. The process cartridge of the present disclosure may further include other units if necessary.

The developing unit includes at least a developer container containing the developer of the present disclosure, and a developer bearer for bearing and conveying the developer contained in the developer container. The developing unit may include a regulating member for regulating the thickness of the born developer.

Figure 3:
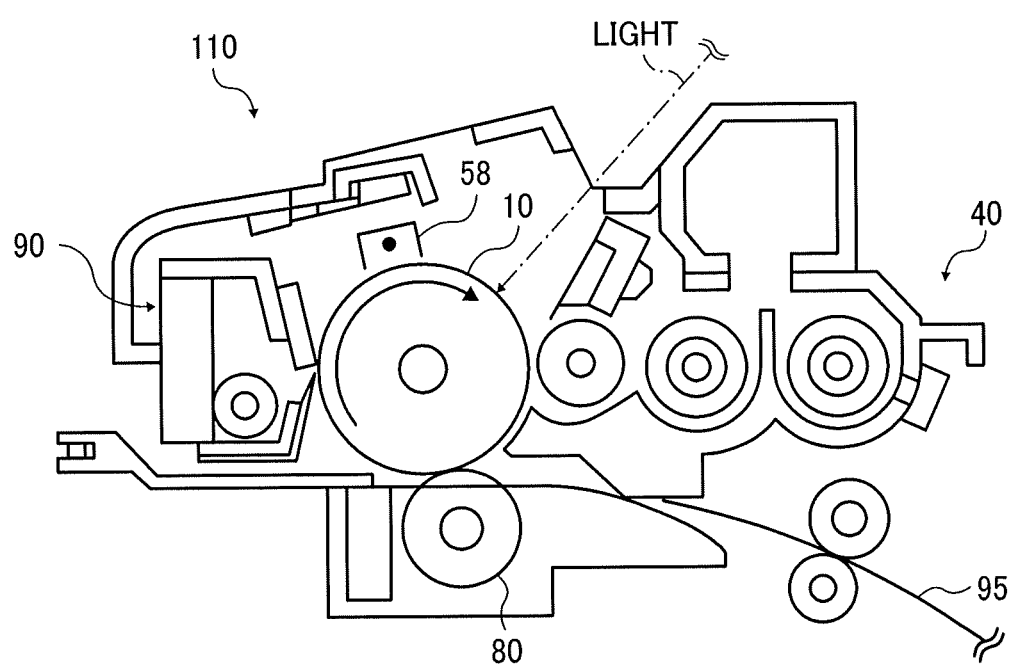
FIG. 3 is a schematic view illustrating an example of a process cartridge.

FIG. 3 illustrates an example of the process cartridge according to the present disclosure. A process cartridge 110 includes a photoconductor drum 10, a corona charger 58, a developing device 40, a transfer roller 80, and a cleaning device 90.

EXAMPLES

Hereinafter, the present disclosure will be more particularly described in examples, but the present disclosure is not limited to the following examples. Hereinafter, unless otherwise particularly noted, "part" indicates part by mass, and "%" indicates mass %.

Producing Example A-1

<Synthesis of Prepolymer A-1 (Amorphous Polyester Resin A-1)>

First, 3-methyl-1,5-pentanediol, isophthalic acid, adipic acid, and trimellitic anhydride were put into a reaction container provided with a cooling tube, a stirrer, and a nitrogen introducing tube such that OH/COOH, which is a molar ratio of hydroxyl group to carboxyl group, was 1.5, the diol component was comprised of 100 mol % of 3-methyl-1,5-pentanediol, the dicarboxylic acid component was comprised of 40 mol % of isophthalic acid and 60 mol % of adipic acid, the amount of trimellitic anhydride in the total monomer was 1 mol %, along with titanium tetraisopropoxide (1,000 ppm with respect to the resin component).

After that, temperature rising was performed to 200° C. for approximately 4 hours, and then, the temperature rising was performed to 230° C. for 2 hours, and a reaction was performed until outflow water disappeared.

After that, a reaction was performed for 5 hours under reduced pressure of 10 mmHg to 15 mmHg, and thus, [Intermediate Polyester A-1] was obtained.

Next, [Intermediate Polyester A-1] and isophorone diisocyanate (IPDI) were put into a reaction container provided with a cooling tube, a stirrer, and a nitrogen introducing tube such that a molar ratio (Isocyanate Group of IPDI/Hydroxyl Group of Intermediate Polyester) was 2.0, and dilution was performed with ethyl acetate such that 50% of an ethyl acetate solution was obtained, and then, a reaction was performed at 100° C. for 5 hours, and thus, [Prepolymer A-1] was obtained.

In the following examples and comparative examples, [Polyester Resin Component A-1] corresponding to the polyester resin component A of the present disclosure is generated from [Prepolymer A-1], in a preparing process of a toner (hereinafter, the same applies to Producing Examples A and B).

Producing Example A-2

<Synthesis of Prepolymer A-2 (Amorphous Polyester Resin A-2)>

First, 3-methyl-1,5-pentanediol, isophthalic acid, adipic acid, and trimellitic anhydride were put into a reaction container provided with a cooling tube, a stirrer, and a nitrogen introducing tube such that OH/COOH, which is a molar ratio of hydroxyl group to carboxyl group, was 1.5, the diol component was comprised of 100 mol % of 3-methyl-1,5-pentanediol, the dicarboxylic acid component was comprised of 33 mol % of isophthalic acid and 67 mol % of adipic acid, and the amount of trimellitic anhydride in the total monomer was 1 mol %, along with titanium tetraisopropoxide (1,000 ppm with respect to the resin component).

After that, temperature rising was performed to 200° C. for approximately 4 hours, and then, the temperature rising was performed to 230° C. for 2 hours, and a reaction was performed until outflow water disappeared.

After that, a reaction was performed 5 hours under reduced pressure of 10 mmHg to 15 mmHg, and thus, [Intermediate Polyester A-2] was obtained.

Next, [Intermediate Polyester A-2] and isophorone diisocyanate (IPDI) were put into a reaction container provided with a cooling tube, a stirrer, and a nitrogen introducing tube such that a molar ratio (Isocyanate Group of IPDI/Hydroxyl Group of Intermediate Polyester) was 2.0, and dilution was performed with ethyl acetate such that 50% of an ethyl acetate solution was obtained, and then, a reaction was performed at 100° C. for 5 hours, and thus, [Prepolymer A-2] was obtained.

Producing Example A-3

<Synthesis of Prepolymer A-3 (Amorphous Polyester Resin A-3)>

First, 3-methyl-1,5-pentanediol, isophthalic acid, adipic acid, and trimellitic anhydride were put into a reaction container provided with a cooling tube, a stirrer, and a nitrogen introducing tube such that OH/COOH, which is a molar ratio of hydroxyl group to carboxyl group, was 1.5, the diol component was comprised of 100 mol % of 3-methyl-1,5-pentanediol, the dicarboxylic acid component was comprised of 67 mol % of isophthalic acid and 33 mol % of adipic acid, and the amount of trimellitic anhydride in the total monomer was 1 mol %, along with titanium tetraisopropoxide (1,000 ppm with respect to the resin component).

After that, temperature rising was performed to 200° C. for approximately 4 hours, and then, the temperature rising was performed to 230° C. for 2 hours, and a reaction was performed until outflow water disappeared.

After that, a reaction was performed for 5 hours under reduced pressure of 10 mmHg to 15 mmHg, and thus, [Intermediate Polyester A-3] was obtained.

Next, [Intermediate Polyester A-3] and isophorone diisocyanate (IPDI) were put into a reaction container provided with a cooling tube, a stirrer, and a nitrogen introducing tube such that a molar ratio (Isocyanate Group of IPDI/Hydroxyl Group of Intermediate Polyester) was 2.0, and dilution was performed with ethyl acetate such that 50% of an ethyl acetate solution was obtained, and then, a reaction was performed at 100° C. for 5 hours, and thus, [Prepolymer A-3] was obtained.

Producing Example A-4

<Synthesis of Prepolymer A-4 (Amorphous Polyester Resin A-4)>

First, 3-methyl-1,5-pentanediol, isophthalic acid, adipic acid, and trimellitic anhydride were put into a reaction container provided with a cooling tube, a stirrer, and a nitrogen introducing tube such that OH/COOH, which is a molar ratio of hydroxyl group to a carboxyl group, was 1.5, the diol component was comprised of 100 mol % of 3-methyl-1,5-pentanediol, the dicarboxylic acid component was comprised of 30 mol % of isophthalic acid and 70 mol % of adipic acid, and the amount of trimellitic anhydride in the total monomer was 1 mol %, along with titanium tetraisopropoxide (1,000 ppm with respect to the resin component).

After that, temperature rising was performed to 200° C. for approximately 4 hours, and then, the temperature rising was performed to 230° C. for 2 hours, and a reaction was performed until outflow water disappeared.

After that, a reaction was performed for 5 hours under reduced pressure of 10 mmHg to 15 mmHg, and thus, [Intermediate Polyester A-4] was obtained.

Next, [Intermediate Polyester A-4] and isophorone diisocyanate (IPDI) were put into a reaction container provided with a cooling tube, a stirrer, and a nitrogen introducing tube such that a molar ratio (Isocyanate Group of IPDI/Hydroxyl Group of Intermediate Polyester) was 2.0, and dilution was performed with ethyl acetate such that 50% of an ethyl acetate solution was obtained, and then, a reaction was performed at 100° C. for 5 hours, and thus, [Prepolymer A-4] was obtained.

Producing Example A-5

<Synthesis of Prepolymer A-5 (Amorphous Polyester Resin A-5)>

First, 3-methyl-1,5-pentanediol, isophthalic acid, adipic acid, and trimellitic anhydride were put into a reaction container provided with a cooling tube, a stirrer, and a nitrogen introducing tube such that OH/COOH, which is a molar ratio of hydroxyl group to carboxyl group, was 1.5, the diol component was comprised of 100 mol % of 3-methyl-1,5-pentanediol, the dicarboxylic acid component was comprised of 70 mol % of isophthalic acid and 30 mol % of adipic acid, and the amount of trimellitic anhydride in the total monomer was 1 mol %, along with titanium tetraisopropoxide (1,000 ppm with respect to the resin component).

After that, temperature rising was performed to 200° C. for approximately 4 hours, and then, the temperature rising was performed to 230° C. for 2 hours, and a reaction was performed until outflow water disappeared.

After that, a reaction was performed for 5 hours under reduced pressure of 10 mmHg to 15 mmHg, and thus, [Intermediate Polyester A-5] was obtained.

Next, [Intermediate Polyester A-5] and isophorone diisocyanate (IPDI) were put into a reaction container provided with a cooling tube, a stirrer, and a nitrogen introducing tube such that a molar ratio (Isocyanate Group of IPDI/Hydroxyl Group of Intermediate Polyester) was 2.0, and dilution was performed with ethyl acetate such that 50% of an ethyl acetate solution was obtained, and then, a reaction was performed at 100° C. for 5 hours, and thus, [Prepolymer A-5] was obtained.

Producing Example B-1

<Synthesis of Prepolymer B-1 (Amorphous Polyester Resin B-1)>

An ethylene oxide two-molar adduct of bisphenol A, a propylene oxide two-molar adduct of bisphenol A, terephthalic acid, and adipic acid were put into a reaction container provided with a cooling tube, a stirrer, and a nitrogen introducing tube, such that OH/COOH, which is a molar ratio of hydroxyl group to carboxyl group, was 1.1, the a diol component was comprised of 80 mol % of the ethylene oxide two-molar adduct of bisphenol A and 20 mol % of a propylene oxide two-molar adduct of bisphenol A, and the dicarboxylic acid component was comprised of 60 mol % of terephthalic acid and 40 mol % of adipic acid, along with titanium tetraisopropoxide (1,000 ppm with respect to the resin component). After that, temperature rising was performed to 200° C. for approximately 4 hours, and then, the temperature rising was performed to 230° C. for 2 hours, and a reaction was performed until outflow water disappeared. After that, a reaction was performed for 5 hours under reduced pressure of 10 mmHg to 15 mmHg, and thus, [Intermediate Polyester B-1] was obtained.

Next, [Intermediate Polyester B-1], which was obtained, and isophorone diisocyanate (IPDI) were put into a reaction container provided with a cooling tube, a stirrer, and a nitrogen introducing tube such that a molar ratio (Isocyanate Group of IPDI/Hydroxyl Group of Intermediate Polyester) was 2.0, and dilution was performed with ethyl acetate such that 50% of an ethyl acetate solution was obtained, and then, a reaction was performed at 100° C. for 5 hours, and thus, [Prepolymer B-1] was obtained.

Producing Example B-2

<Synthesis of Prepolymer B-2 (Amorphous Polyester Resin B-2)>

An ethylene oxide two-molar adduct of bisphenol A, a propylene oxide two-molar adduct of bisphenol A, terephthalic acid, and adipic acid were put into a reaction container provided with a cooling tube, a stirrer, and a nitrogen introducing tube such that OH/COOH, which is a molar ratio of hydroxyl group to carboxyl group, was 1.1, the diol component was comprised of 80 mol % of the ethylene oxide two-molar adduct of bisphenol A and 20 mol % of the propylene oxide two-molar adduct of bisphenol A, and the dicarboxylic acid component was comprised of 30 mol % of terephthalic acid and 70 mol % of adipic acid, along with titanium tetraisopropoxide (1,000 ppm with respect to the resin component). After that, temperature rising was performed to 200° C. for approximately 4 hours, and then, the temperature rising was performed to 230° C. for 2 hours, and a reaction was performed until outflow water disappeared. After that, a reaction was performed for 5 hours under reduced pressure of 10 mmHg to 15 mmHg, and thus, [Intermediate Polyester B-2] was obtained.

Next, [Intermediate Polyester B-2], which was obtained, and isophorone diisocyanate (IPDI) were put into a reaction container provided with a cooling tube, a stirrer, and a nitrogen introducing tube such that a molar ratio (Isocyanate Group of IPDI/Hydroxyl Group of Intermediate Polyester) was 2.0, and dilution was performed with ethyl acetate such that 50% of an ethyl acetate solution was obtained, and then, a reaction was performed at 100° C. for 5 hours, and thus, [Prepolymer B-2] was obtained.

Producing Example B-3

<Synthesis of Prepolymer B-3 (Amorphous Polyester Resin B-3)>

An ethylene oxide two-molar adduct of bisphenol A, a propylene oxide two-molar adduct of bisphenol A, terephthalic acid, and adipic acid were put into a reaction container provided with a cooling tube, a stirrer, and a nitrogen introducing tube such that OH/COOH, which is a molar ratio of hydroxyl group to carboxyl group, was 1.1, the diol component was comprised of 80 mol % of the ethylene oxide two-molar adduct of bisphenol A and 20 mol % of the propylene oxide two-molar adduct of bisphenol A, and the di carboxylic acid component was comprised of 80 mol % of terephthalic acid and 20 mol % of adipic acid, along with titanium tetraisopropoxide (1,000 ppm with respect to the resin component). After that, temperature rising was performed to 200° C. for approximately 4 hours, and then, the temperature rising was performed to 230° C. for 2 hours, and a reaction was performed until outflow water disappeared. After that, a reaction was performed for 5 hours under reduced pressure of 10 mmHg to 15 mmHg, and thus, [Intermediate Polyester B-3] was obtained.

Next, [Intermediate Polyester B-3], which was obtained, and isophorone diisocyanate (IPDI) were put into a reaction container provided with a cooling tube, a stirrer, and a nitrogen introducing tube such that a molar ratio (Isocyanate Group of IPDI/Hydroxyl Group of Intermediate Polyester) was 2.0, and dilution was performed with ethyl acetate such that 50% of an ethyl acetate solution was obtained, and then, a reaction was performed at 100° C. for 5 hours, and thus, [Prepolymer B-3] was obtained.

Producing Example C-1

<Synthesis of Amorphous Polyester Resin C-1>

A bisphenol A ethylene oxide two-molar adduct, a bisphenol A propylene oxide three-molar adduct, terephthalic acid, adipic acid, and trimethylol propane were put into a four-necked flask provided with a nitrogen introducing tube, a dewatering tube, a stirrer, and a thermocouple such that a molar ratio of the bisphenol A ethylene oxide two-molar adduct to the bisphenol A propylene oxide three-molar adduct (Bisphenol A Ethylene Oxide Two-Molar Adduct/ Bisphenol A Propylene Oxide Three-Molar Adduct) was 85/15, a molar ratio of terephthalic acid to adipic acid (Terephthalic Acid/Adipic Acid) was 75/25, the amount of trimethylol propane in the total monomer was 1 mol %, and OH/COOH, which is a molar ratio of hydroxyl group to carboxyl group, was 1.2, a reaction was performed at 230° C. and an ordinary pressure for 8 hours, along with titanium tetraisopropoxide (500 ppm with respect to the resin component), and a reaction was performed at a reduced pressure of 10 mmHg to 15 mmHg for 4 hours, and then, trimellitic anhydride was put into a reaction container such that the amount was 1 mol % with respect to the total resin component, and a reaction was performed at 180° C. and an ordinary pressure for 3 hours, and thus, [Amorphous Polyester Resin C-1] was obtained.

Producing Example C-2

<Synthesis of Amorphous Polyester Resin C-2>

A bisphenol A ethylene oxide two-molar adduct, a bisphenol A propylene oxide three-molar adduct, terephthalic acid, adipic acid, and trimethylol propane were put into a four-necked flask provided with a nitrogen introducing tube, a dewatering tube, a stirrer, and a thermocouple such that a molar ratio of the bisphenol A ethylene oxide two-molar adduct to the bisphenol A propylene oxide three-molar adduct (Bisphenol A Ethylene Oxide Two-Molar Adduct/ Bisphenol A Propylene Oxide Three-Molar Adduct) was 85/15, a molar ratio of terephthalic acid to adipic acid (Terephthalic Acid/Adipic Acid) was 65/35, the amount of trimethylol propane in the total monomer was 1 mol %, and OH/COOH, which is a molar ratio of hydroxyl group to carboxyl group, was 1.2, a reaction was performed at 230° C. and an ordinary pressure for 8 hours, along with titanium tetraisopropoxide (500 ppm with respect to the resin component), and a reaction was performed at a reduced pressure of 10 mmHg to 15 mmHg for 4 hours, and then, trimellitic anhydride was put into a reaction container such that the amount was 1 mol % with respect to the total resin component, and a reaction was performed at 180° C. and an ordinary pressure for 3 hours, and thus, [Amorphous Polyester Resin C-2] was obtained.

Producing Example C-3

<Synthesis of Amorphous Polyester Resin C-3>

A bisphenol A ethylene oxide two-molar adduct, a bisphenol A propylene oxide three-molar adduct, terephthalic acid, adipic acid, and trimethylol propane were put into a four-necked flask provided with a nitrogen introducing tube, a dewatering tube, a stirrer, and a thermocouple such that a molar ratio of the bisphenol A ethylene oxide two-molar adduct to the bisphenol A propylene oxide three-molar adduct (Bisphenol A Ethylene Oxide Two-Molar Adduct/ Bisphenol A Propylene Oxide Three-Molar Adduct) was 85/15, a molar ratio of terephthalic acid to adipic acid (Terephthalic Acid/Adipic Acid) was 85/15, the amount of trimethylol propane in the total monomer was 1 mol %, and OH/COOH, which is a molar ratio of hydroxyl group to carboxyl group, was 1.2, a reaction was performed at 230° C. and an ordinary pressure for 8 hours, along with titanium tetraisopropoxide (500 ppm with respect to the resin component), and a reaction was performed at a reduced pressure of 10 mmHg to 15 mmHg for 4 hours, and then, trimellitic anhydride was put into a reaction container such that the amount was 1 mol % with respect to the total resin component, and a reaction was performed at 180° C. and an ordinary pressure for 3 hours, and thus, [Amorphous Polyester Resin C-3] was obtained.

Producing Example C-4

<Synthesis of Amorphous Polyester Resin C-4>

A bisphenol A ethylene oxide two-molar adduct, a bisphenol A propylene oxide three-molar adduct, terephthalic acid, adipic acid, and trimethylolpropane were put into a four-necked flask provided with a nitrogen introducing tube, a dewatering tube, a stirrer, and a thermocouple such that a molar ratio of the bisphenol A ethylene oxide two-molar adduct to the bisphenol A propylene oxide three-molar adduct (Bisphenol A Ethylene Oxide Two-Molar Adduct/ Bisphenol A Propylene Oxide Three-Molar Adduct) was 85/15, a molar ratio of terephthalic acid to adipic acid (Terephthalic Acid/Adipic Acid) was 60/40, the amount of trimethylolpropane in the total monomer was 1 mol %, and OH/COOH, which is a molar ratio of hydroxyl group to carboxyl group, was 1.2, a reaction was performed at 230° C. and an ordinary pressure for 8 hours, along with titanium tetraisopropoxide (500 ppm with respect to the resin component), and a reaction was performed at a reduced pressure of 10 mmHg to 15 mmHg for 4 hours, and then, trimellitic anhydride was put into a reaction container such that the amount was 1 mol % with respect to the total resin component, and a reaction was performed at 180° C. and an ordinary pressure for 3 hours, and thus, [Amorphous Polyester Resin C-4] was obtained.

Producing Example C-5

<Synthesis of Amorphous Polyester Resin C-5>

A bisphenol A ethylene oxide two-molar adduct, a bisphenol A propylene oxide three-molar adduct, terephthalic acid, adipic acid, and trimethylolpropane were put into a four-necked flask provided with a nitrogen introducing tube, a dewatering tube, a stirrer, and a thermocouple such that a molar ratio of the bisphenol A ethylene oxide two-molar adduct to the bisphenol A propylene oxide three-molar adduct (Bisphenol A Ethylene Oxide Two-Molar Adduct/Bisphenol A Propylene Oxide Three-Molar Adduct) was 90/10, a molar ratio of terephthalic acid to adipic acid (Terephthalic Acid/Adipic Acid) was 75/25, the amount of trimethylolpropane in the total monomer was 1 mol %, and OH/COOH, which is a molar ratio of hydroxyl group to carboxyl group, was 1.2, a reaction was performed at 230° C. and an ordinary pressure for 8 hours, along with titanium tetraisopropoxide (500 ppm with respect to the resin component), and a reaction was performed at a reduced pressure of 10 mmHg to 15 mmHg for 4 hours, and then, trimellitic anhydride was put into a reaction container such that the amount was 1 mol % with respect to the total resin component, and a reaction was performed at 180° C. and an ordinary pressure for 3 hours, and thus, [Amorphous Polyester Resin C-5] was obtained.

Producing Example D-1

<Synthesis of Crystalline Polyester Resin D-1>

Dodecanedioic acid and 1,6-hexanediol were put into a four-necked flask of 5 L, provided with a nitrogen introducing tube, a dewatering tube, a stirrer, and a thermocouple such that OH/COOH, which is a molar ratio of hydroxyl group to carboxyl group, was 0.9, a reaction was performed at 180° C. for 10 hours, along with titanium tetraisopropoxide (500 ppm with respect to the resin component), temperature rising was performed to 200° C. and a reaction was performed for 3 hours, and a reaction was performed at a pressure of 8.3 kPa for 2 hours, and thus, [Crystalline Polyester Resin D-1] was obtained.
<Preparation of Crystalline Polyester Resin Dispersion Liquid>

First, 50 parts of [Crystalline Polyester Resin D-1] and 450 parts of ethyl acetate were put into a container in which a stirring rod and a thermometer were set, temperature rising was performed to 80° C. under stirring, retention was performed at 80° C. for 5 hours, and then, cooling was performed to 30° C. for 1 hour. Next, dispersion was performed using a bead mill (Ultra visco mill, manufactured by AMEX CO., Ltd.) filled with zirconia beads having a diameter of 0.5 mm at 80 volume %, at a liquid feeding speed of 1 kg/hr and a disk peripheral velocity of 6 m/second, in a condition of three-pass, and thus, [Crystalline Polyester Resin Dispersion Liquid 1] was obtained.

Example 1

<Preparation of Masterbatch (MB)>

First, 1,200 parts of water, 500 parts of carbon black (Degussa Printex35) [DBP Oil Absorption=42 mL/100 mg, pH=9.5], and 500 parts of [Amorphous Polyester Resin C-1] were mixed by a Henschel mixer (manufactured by NIPPON COKE & ENGINEERING CO., LTD.), and the mixture was kneaded at 150° C. for 30 minutes by using two rolls, and then, was subjected to rolling and cooling, and was ground by a pulverizer, and thus, [Masterbatch 1] was obtained.
<Preparation of WAX Dispersion Liquid>

First, 50 parts of paraffin wax (manufactured by NIPPON SEIRO CO., LTD., HNP-9, hydrocarbon-based wax, a melting point of 75° C., and an SP value of 8.8) as a release agent 1, and 450 parts of ethyl acetate were put into a container in which a stirring rod and a thermometer were set, temperature rising was performed to 80° C. under stirring, retention was performed at 80° C. for 5 hours, and then, cooling was performed at 30° C. for 1 hour. Next, dispersion was performed using a bead mill (Ultra visco mill, manufactured by AIMEX CO., Ltd.) filled with zirconia beads having a diameter of 0.5 mm at 80 volume %, at a liquid feeding speed of 1 kg/hr and a disk peripheral velocity of 6 m/second, in a condition of three-pass, and thus, [WAX Dispersion Liquid 1] was obtained.
<Synthesis of Ketimine Compound>

First, 170 parts of isophoronediamine and 75 parts of methyl ethyl ketone were put into a reaction container in which a stirring rod and a thermometer were set, and a reaction was performed at 50° C. for 5 hours, and thus, [Ketimine Compound 1] was obtained. An amine value of [Ketimine Compound 1] was 418.
<Preparation of Oil Phase>

First, 500 parts of [WAX Dispersion Liquid 1], 76 parts of [Prepolymer A-1], 152 parts of [Prepolymer B-1], 836 parts of [Amorphous Polyester Resin C-1], 100 parts of [Masterbatch 1], and 2 parts of [Ketimine Compound 1] as a curing agent were put into a container, and were mixed by a TK homomixer (manufactured by PRIMIX Corporation) at 5,000 rpm for 60 minutes, and thus, [Oil Phase 1] was obtained.
<Synthesis of Organic Fine Particles Emulsion (Fine Particle Dispersion Liquid)>

First, 683 parts of water, 11 parts of a sodium salt of methacrylateethylene oxide adduct sulfate ester (ELEMINOL RS-30: manufactured by Sanyo Chemical Industries, Ltd.), 138 parts of styrene, 138 parts of methacrylate, and 1 part of ammonium persulfate were put into a reaction container in which a stirring rod and a thermometer were set, and were stirred at 400 rotations/minute for 15 minutes, and thus, a white emulsion was obtained. The systems was heated to a temperature of 75° C., and a reaction was performed for 5 hours. Next, 30 parts of an aqueous solution of ammonium persulfate of 1% was added, maturing was performed at 75° C. for 5 hours, and thus, an aqueous dispersion liquid of a vinyl-based resin (a copolymer of a sodium salt of styrene-methacrylic acid-methacrylate ethylene oxide adduct sulfate ester) [Fine Particle Dispersion Liquid 1] was obtained.

A volume average particle diameter of [Fine Particle Dispersion Liquid 1], which was measured by LA-920 (manufactured by HORIBA, Ltd.), was 0.14 μm. A part of [Fine Particle Dispersion Liquid 1] was dried, and the resin content was isolated.
<Preparation of Water Phase>

First, 990 parts of water, 83 parts of [Fine Particle Dispersion Liquid 1], 37 parts of an aqueous solution of sodium dodecyl diphenyl ether disulfonate of 48.5% (ELEMINOL MON-7: manufactured by Sanyo Chemical Industries, Ltd.), and 90 parts of ethyl acetate were mixed and stirred, and thus, a milky white liquid was obtained. The liquid was set to [Water Phase 1].

<Emulsification and Desolvation>

First, 1,200 parts of [Water Phase 1] was put into a container where [Oil Phase 1] was contained, and was mixed by a TK homomixer at the number of rotations of 13,000 rpm for 20 minutes, and thus, [Emulsification Slurry 1] was obtained. Next, [Emulsification Slurry 1] was put into a container in which a stirrer and a thermometer were set, and desolvation was performed at 30° C. for 8 hours, and then, maturing was performed at 45° C. for 4 hours, and thus, [Dispersion Slurry 1] was obtained.

<Washing and Drying>

First, 100 parts of [Dispersion Slurry 1] was filtered under reduced pressure, and then, the following series of operations (1) to (4) was performed twice.

(1): 100 parts of ion exchange water was added to filter cake, was mixed by a TK homomixer (at the number of rotations of 12,000 rpm for 10 minutes), and then, was filtered.

(2): 100 parts of a sodium hydroxide aqueous solution of 10% was added to the filter cake of (1), was mixed by a TK homomixer (at the number of rotations of 12,000 rpm for 30 minutes), and then, was filtered under reduced pressure.

(3): 100 parts of hydrochloric acid of 10% was added to the filter cake of (2), was mixed by a TK homomixer (at the number of rotations of 12,000 rpm for 10 minutes), and then, was filtered.

(4): 300 parts of ion exchange water was added to the filter cake of (3), was mixed by a TK homomixer (at the number of rotations of 12,000 rpm for 10 minutes), and then, was filtered, and thus, [Filter Cake] was obtained.

[Filter Cake] was dried by a circulating drier at 45° C. for 48 hours, and was sieved by a mesh having a mesh opening of 75 μm, and thus, [Toner Base Particles 1] was obtained.

<External Addition Treatment>

First, 100 parts by mass of [Toner Base Particles 1] were mixed with 0.6 parts by mass of hydrophobic silica having an average particle diameter of 100 nm, 1.0 parts by mass of titanium oxide having an average particle diameter of 20 nm, and 0.8 parts of a hydrophobic silica fine powder having an average particle diameter of 15 nm by a Henschel mixer, and thus, [Toner 1] was obtained.

<Preparation of Carrier>

First, 100 parts by mass of a silicone resin (organo straight silicone), 5 parts by mass of γ-(2-aminoethyl) aminopropyl trimethoxy silane, and 10 parts by mass of carbon black were added to 100 parts by mass of toluene, and were dispersed by a homomixer for 20 minutes, and thus, a resin layer coating liquid was prepared. The resin layer coating liquid was applied onto the surface of 1,000 parts by mass of spherical magnetite having an average particle diameter of 50 μm by using a fluidized bed type coating device, and thus, [Carrier] was prepared.

<Preparation of Developer>

Five parts by mass of [Toner 1] and 95 parts by mass of [Carrier] were mixed by using a ball mill, and thus, a developer was prepared.

Example 2

[Toner Base Particles 2] were obtained by the same method as in Example 1, except that [Prepolymer A-1] was replaced with [Prepolymer A-2], and [Polyester Resin C-1] was replaced with [Polyester Resin C-2]. [Toner 2] was prepared by using [Toner Base Particles 2].

Example 3

[Toner Base Particles 3] were obtained by the same method as in Example 1, except that [Prepolymer A-1] was replaced with [Prepolymer A-2], and [Polyester Resin C-1] was replaced with [Polyester Resin C-3]. [Toner 3] was prepared by using [Toner Base Particles 3].

Example 4

[Toner Base Particles 4] were obtained by the same method as in Example 1, except that [Prepolymer A-1] was replaced with [Prepolymer A-3], and [Polyester Resin C-1] was replaced with [Polyester Resin C-2]. [Toner 4] was prepared by using [Toner Base Particles 4].

Example 5

[Toner Base Particles 5] were obtained by the same method as in Example 1, except that [Prepolymer A-1] was replaced with 152 parts of [Prepolymer A-3], and [Polyester Resin C-1] was replaced with 798 parts of [Polyester Resin C-3]. [Toner 5] was prepared by using [Toner Base Particles 5].

Example 6

[Toner Base Particles 6] were obtained by the same method as in Example 1, except that [Prepolymer A-1] was replaced with 134 parts of [Prepolymer A-1], [Prepolymer B-1] was replaced with 266 parts of [Prepolymer B-1], and [Polyester Resin C-1] was replaced with 751 parts of [Polyester Resin C-1]. [Toner 6] was prepared by using [Toner Base Particles 6].

Example 7

[Toner Base Particles 7] were obtained by the same method as in Example 1, except that [Prepolymer B-1] was replaced with [Prepolymer B-2]. [Toner 7] was prepared by using [Toner Base Particles 7].

Example 8

[Toner Base Particles 8] were obtained by the same method as in Example 1, except that [Prepolymer B-1] was replaced with [Prepolymer B-3]. [Toner 8] was prepared by using [Toner Base Particles 8].

Example 9

[Toner Base Particles 9] were obtained by the same method as in Example 1, except that [Oil Phase 9] was used in which 500 parts of [WAX Dispersion Liquid 1], 76 parts of [Prepolymer A-1], 152 parts of [Prepolymer B-1], 836 parts of [Amorphous Polyester Resin C-1], 300 parts of [Crystalline Polyester Resin Dispersion Liquid 1], 100 parts of [Masterbatch 1], and 2 parts of [Ketimine Compound 1] as a curing agent were mixed by a TK homomixer (manufactured by PRIMIX Corporation) at 5,000 rpm for 60 minutes in a container. [Toner 9] was prepared by using [Toner Base Particles 9].

Example 10

[Toner Base Particles 10] were obtained by the same method as in Example 1, except that [Oil Phase 10] was used in which 500 parts of [WAX Dispersion Liquid 1], 76 parts of [Prepolymer A-1], 152 parts of [Prepolymer B-1], 836 parts of [Amorphous Polyester Resin C-1], 171 parts of [Crystalline Polyester Resin Dispersion Liquid 1], 100 parts of [Masterbatch 1], and 2 parts of [Ketimine Compound 1] as a curing agent were mixed by a TK homomixer (manufactured by PRIMIX Corporation) at 5,000 rpm for 60 minutes in a container. [Toner 10] was prepared by using [Toner Base Particles 10].

Example 11

[Toner Base Particles 11] were obtained by the same method as in Example 1, except that [Oil Phase 11] was used in which 500 parts of [WAX Dispersion Liquid 1], 76 parts of [Prepolymer A-1], 534 parts of [Prepolymer B-1], 836 parts of [Amorphous Polyester Resin C-1], 514 parts of [Crystalline Polyester Resin Dispersion Liquid 1], 100 parts of [Masterbatch 1], and 2 parts of [Ketimine Compound 1] as a curing agent were mixed by a TK homomixer (manufactured by PRIMIX Corporation) at 5,000 rpm for 60 minutes in a container. [Toner 11] was prepared by using [Toner Base Particles 11].

Example 12

[Toner Base Particles 12] were obtained by the same method as in Example 1, except that [Oil Phase 12] was used in which 500 parts of [WAX Dispersion Liquid 1], 152 parts of [Prepolymer A-2], 251 parts of [Prepolymer B-2], 836 parts of [Amorphous Polyester Resin C-3], 100 parts of [Masterbatch 1], and 2 parts of [Ketimine Compound 1] as a curing agent were mixed by a TK homomixer (manufactured by PRIMIX Corporation) at 5,000 rpm for 60 minutes in a container. [Toner 12] was prepared by using [Toner Base Particles 12].

Example 13

[Toner Base Particles 13] were obtained by the same method as in Example 1, except that [Oil Phase 13] was used in which 500 parts of [WAX Dispersion Liquid 1], 34 parts of [Prepolymer A-3], 534 parts of [Prepolymer B-3], 836 parts of [Amorphous Polyester Resin C-3], 100 parts of [Masterbatch 1], and 2 parts of [Ketimine Compound 1] as a curing agent were mixed by a TK homomixer (manufactured by PRIMIX Corporation) at 5,000 rpm for 60 minutes in a container. [Toner 13] was prepared by using [Toner Base Particles 13].

Comparative Example 1

[Toner Base Particles 14] were obtained by the same method as in Example 1, except that [Prepolymer A-1] was replaced with [Prepolymer A-4]. [Toner 14] was prepared by using [Toner Base Particles 14].

Comparative Example 2

[Toner Base Particles 15] were obtained by the same method as in Example 1, except that [Prepolymer A-1] was replaced with [Prepolymer A-5]. [Toner 15] was prepared by using [Toner Base Particles 15].

Comparative Example 3

[Toner Base Particles 16] were obtained by the same method as in Example 1, except that [Polyester Resin C-1] was replaced with [Polyester Resin C-4]. [Toner 16] was prepared by using [Toner Base Particles 16].

Comparative Example 4

[Toner Base Particles 17] were obtained by the same method as in Example 1, except that [Polyester Resin C-1] was replaced with [Polyester Resin C-5]. [Toner 17] was prepared by using [Toner Base Particles 17].

Comparative Example 5

[Toner Base Particles 18] were obtained by the same method as in Example 1, except that the prepolymer B-1 was replaced with 0 parts of the prepolymer B-1 (not used). [Toner 18] was prepared by using [Toner Base Particles 18].

Comparative Example 6

[Toner Base Particles 19] were obtained by the same method as in Example 1, except that the prepolymer A-1 was replaced with 0 parts of the prepolymer A-1 (not used). [Toner 19] was prepared by using [Toner Base Particles 19].

(Measurement)

<Toner Tg1st, Toner Tg2nd, Tga1st, Tgb1st, and Tg2nd' of THF Insolubles, Glass Transition Temperatures of Polyester Resin Components A, B, and C>

First, 1 g of a toner was put into 100 mL of THF, was subjected to soxhlet extraction, and thus, THF solubles and THF insolubles were obtained. The THF solubles and the THF insolubles were dried by a vacuum drier for 24 hours, and thus, the polyester resin component C (in Examples 9 to 11, the mixture with the crystalline polyester resin D) was obtained from the THF solubles, the mixture of the polyester resin component A and the polyester resin component B was obtained from the THF insolubles. The obtained mixtures were set to a target sample. In the measurement of the toner Tg1st and the toner Tg2nd, the toner was set to a target sample.

Next, approximately 5.0 mg of the target sample was put into an aluminum sample container, the sample container was placed on a holder unit, and was set in an electric furnace. Next, heating was performed from −80° C. to 150° C. at temperature raising rate of 1.0° C./min under a nitrogen atmosphere (the first temperature rising). After that, cooling was performed from 150° C. to −80° C. at a temperature dropping rate of 1.0° C./min, and heating was performed to 150° C. at a temperature raising rate of 1.0° C./min (the second temperature rising). A DSC curve was measured by using a differential scanning calorimeter ("Q-200", manufactured by TA Instruments Japan Inc.) at each of the first temperature rising and the second temperature rising.

From the obtained DSC curves, a DSC curve at the first temperature rising was selected, and the glass transition temperature Tg1st of the target sample at the first temperature rising was obtained, by using the analysis program in the Q-200 system. Similarly, a DSC curve at the second temperature rising was selected, and the glass transition temperature Tg2nd of the target sample at the second temperature rising was obtained.

From the obtained DSC curves, the DSC curve at the first temperature rising was selected, and the glass transition temperature Tg1st of the target sample at the first temperature rising was obtained, by using the analysis program in the Q-200 system. Similarly, the DSC curve at the second temperature rising was selected, and the glass transition temperature Tg2nd of the target sample at the second temperature rising was obtained.

From the obtained DSC curve, the DSC curve at the first temperature rising was selected, and an endothermic peak top temperature of the target sample at the first temperature rising was obtained as a melting point, by using the analysis program in the Q-200 system. Similarly, the DSC curve at the second temperature rising was selected, and an endothermic peak top temperature of the target sample at the second temperature rising was obtained as a melting point.

The melting point and the glass transition temperature Tg of the polyester resin components A, B, and C and other structural components such as the release agent refer to, unless otherwise particularly noted, the endothermic peak top temperature and the glass transition temperature Tg2nd at the second temperature rising, respectively.

With respect to the component insoluble in THF of toner, heating was performed from −80° C. to 150° C. at a temperature raising rate of 1.0° C./min (the first temperature rising) while applying Modulation Temperature Amplitude: ±1.0° C./minute by using a modulation mode. Then, as described above, the obtained DSC curve was analyzed by setting "Reversing Heat Flow" to a vertical axis to determine the onset value illustrated in FIG. 1 as Tg, by using the analysis program in the Q-200 system. Accordingly, Tga1st, Tgb1st, and Tg2nd' were obtained.

<Mass Ratio of Polyester Resin Components A, B, and C>

A mass ratio between the polyester resin component C and the crystalline polyester resin D was obtained from the THF solubles obtained by the soxhlet extraction, and a composition ratio between the polyester resin component C and the crystalline polyester resin D was obtained. A mass ratio of the polyester resin components A and B was obtained from the THF insolubles obtained by the soxhlet extraction, and a composition ratio between the polyester resin component A and the polyester resin component B was obtained.

The constituent ratio, Tg1st, and Tg2nd of the toner, the glass transition temperature of the polyester resin components A, B, and C, and the like are illustrated in Table 1 and Table 2.

TABLE 1

|  | Toner | Polyester Resin Component A | | | Polyester Resin Component B | | | Polyester Resin Component C | | | Crystalline Polyester Resin D | | Release Agent (Parts by Mass) | Pigment (Parts by Mass) | Curing Agent (Parts by Mass) |
| --- | --- | --- | --- | --- | --- | --- | --- | --- | --- | --- | --- | --- | --- | --- | --- |
|  |  | Type | Tg2nd (° C.) | Composition Ratio | Type | Tg2nd (° C.) | Composition Ratio | Type | Tg2nd (° C.) | Composition Ratio | Type | Parts by Mass |  |  |  |
| Example 1 | 1 | A-1 | −40 | 0.04 | B-1 | 55 | 0.08 | C-1 | 55 | 0.88 | — | — | 50 | 50 | 2 |
| Example 2 | 2 | A-2 | −50 | 0.04 | B-1 | 55 | 0.08 | C-2 | 45 | 0.88 | — | — | 50 | 50 | 2 |
| Example 3 | 3 | A-2 | −50 | 0.04 | B-1 | 55 | 0.08 | C-3 | 65 | 0.88 | — | — | 50 | 50 | 2 |
| Example 4 | 4 | A-3 | 0 | 0.04 | B-1 | 55 | 0.08 | C-2 | 45 | 0.88 | — | — | 50 | 50 | 2 |
| Example 5 | 5 | A-3 | 0 | 0.08 | B-1 | 55 | 0.08 | C-3 | 65 | 0.84 | — | — | 50 | 50 | 2 |
| Example 6 | 6 | A-1 | −40 | 0.07 | B-1 | 55 | 0.14 | C-1 | 55 | 0.79 | — | — | 50 | 50 | 2 |
| Example 7 | 7 | A-1 | −40 | 0.04 | B-2 | 45 | 0.08 | C-1 | 55 | 0.88 | — | — | 50 | 50 | 2 |
| Example 8 | 8 | A-1 | −40 | 0.04 | B-3 | 65 | 0.08 | C-1 | 55 | 0.88 | — | — | 50 | 50 | 2 |
| Example 9 | 9 | A-1 | −40 | 0.04 | B-1 | 55 | 0.08 | C-1 | 55 | 0.88 | D-1 | 2.5 | 50 | 50 | 2 |
| Example 10 | 10 | A-1 | −40 | 0.04 | B-1 | 55 | 0.08 | C-1 | 55 | 0.88 | D-1 | 1 | 50 | 50 | 2 |
| Example 11 | 11 | A-1 | −40 | 0.04 | B-1 | 55 | 0.08 | C-1 | 55 | 0.88 | D-1 | 4 | 50 | 50 | 2 |
| Example 12 | 12 | A-2 | −50 | 0.08 | B-2 | 45 | 0.04 | C-3 | 65 | 0.88 | — | — | 50 | 50 | 2 |
| Example 13 | 13 | A-3 | 0 | 0.01 | B-3 | 65 | 0.14 | C-3 | 65 | 0.85 | — | — | 50 | 50 | 2 |
| Comparative Example 1 | 14 | A-4 | −55 | 0.04 | B-1 | 55 | 0.08 | C-1 | 55 | 0.88 | — | — | 50 | 50 | 2 |
| Comparative Example 2 | 15 | A-5 | 5 | 0.04 | B-1 | 55 | 0.08 | C-1 | 55 | 0.88 | — | — | 50 | 50 | 2 |
| Comparative Example 3 | 16 | A-1 | −40 | 0.04 | B-1 | 55 | 0.08 | C-4 | 40 | 0.88 | — | — | 50 | 50 | 2 |
| Comparative Example 4 | 17 | A-1 | −40 | 0.04 | B-1 | 55 | 0.08 | C-5 | 70 | 0.88 | — | — | 50 | 50 | 2 |
| Comparative Example 5 | 18 | A-1 | −40 | 0.04 | — | — | — | C-1 | 55 | 0.96 | — | — | 50 | 50 | 2 |
| Comparative Example 6 | 19 | — | — | — | B-1 | 55 | 0.08 | C-1 | 55 | 0.92 | — | — | 50 | 50 | 2 |

TABLE 2

|  |  | Toner | | | THF Solubles | THF Insolubles | | |
| --- | --- | --- | --- | --- | --- | --- | --- | --- |
|  | Toner | Tg1st (° C.) | Tg2nd (° C.) | Tg1st−Tg2nd (° C.) | Tg2nd (° C.) | Tga1st (° C.) | Tgb1st (° C.) | Tg2nd' (° C.) |
| Example 1 | 1 | 57 | 51 | 6 | 55 | −37 | 57 | 10 |
| Example 2 | 2 | 47 | 42 | 5 | 45 | −45 | 57 | 6 |
| Example 3 | 3 | 64 | 58 | 6 | 65 | −45 | 57 | 6 |
| Example 4 | 4 | 51 | 45 | 6 | 45 | 3 | 57 | 30 |
| Example 5 | 5 | 65 | 59 | 6 | 65 | 3 | 57 | 30 |
| Example 6 | 6 | 53 | 45 | 8 | 55 | −37 | 57 | 10 |
| Example 7 | 7 | 50 | 45 | 5 | 55 | −37 | 48 | 5 |
| Example 8 | 8 | 62 | 56 | 6 | 55 | −37 | 68 | 15 |
| Example 9 | 9 | 57 | 41 | 16 | 52 | −37 | 57 | 10 |

TABLE 2-continued

|  | Toner | Toner Tg1st (° C.) | Tg2nd (° C.) | Tg1st-Tg2nd (° C.) | THF Solubles Tg2nd (° C.) | THF Insolubles Tga1st (° C.) | Tgb1st (° C.) | Tg2nd' (° C.) |
|---|---|---|---|---|---|---|---|---|
| Example 10 | 10 | 57 | 47 | 10 | 53 | −37 | 57 | 10 |
| Example 11 | 11 | 57 | 40 | 17 | 51 | −37 | 57 | 10 |
| Example 12 | 12 | 53 | 45 | 8 | 65 | −45 | 48 | −2 |
| Example 13 | 13 | 65 | 56 | 9 | 65 | −37 | 68 | 53 |
| Comparative Example 1 | 14 | 56 | 47 | 9 | 55 | −50 | 57 | 4 |
| Comparative Example 2 | 15 | 60 | 51 | 9 | 55 | 10 | 57 | 34 |
| Comparative Example 3 | 16 | 44 | 40 | 4 | 40 | −37 | 57 | 10 |
| Comparative Example 4 | 17 | 69 | 62 | 7 | 70 | −37 | 57 | 10 |
| Comparative Example 5 | 18 | 57 | 50 | 7 | 55 | −37 | — | −40 |
| Comparative Example 6 | 19 | 62 | 55 | 7 | 55 | — | 57 | 55 |

(Evaluation)

The obtained toner and the developer were evaluated as follows. The developer was prepared by the same method as that in Example 1. The results are illustrated in Table 3.

<Evaluation of Regular Paper Low Temperature Fixing Properties and Hot-Offset Resistance>

Figure 2:
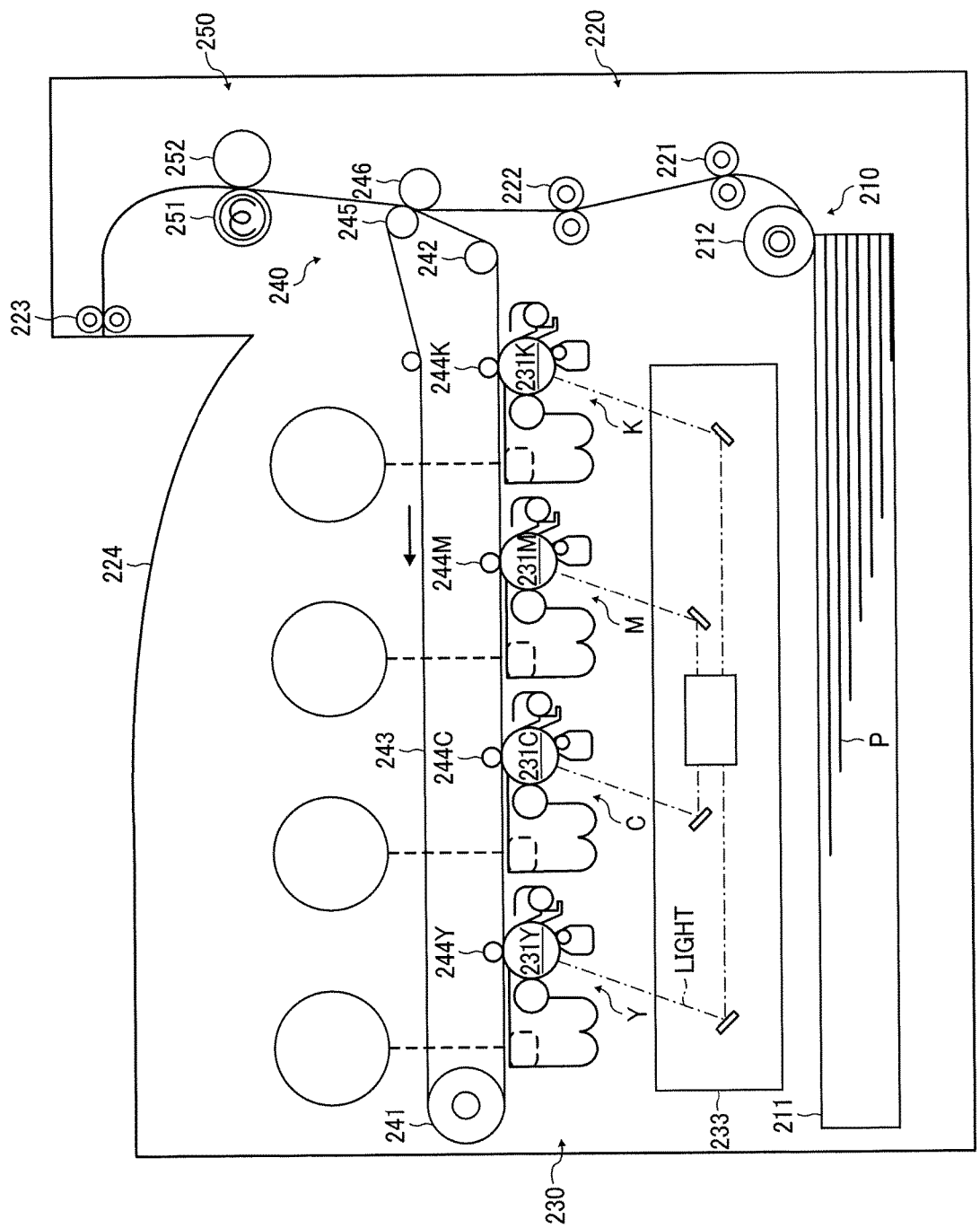
FIG. 2 is a schematic view illustrating an example of an image forming device according to an embodiment of the present disclosure.

The developer was mounted on the image forming device illustrated in FIG. 2, and a rectangular solid image of 2 cm×15 cm was formed on a PPC paper type 6000<70W>A4 Long Grain (manufactured by Ricoh Co., Ltd.) in a monochromic mode, such that the deposition amount of the toner was 0.40 mg/cm². At this time, a surface temperature of the fixing roller was varied to observe whether or not there was the occurrence of offset that a developing residual image of the solid image is fixed to a location other than a desired location, and a fixing temperature at which cold offset and hot offset occurred were evaluated. The solid image was prepared in a position of 3.0 cm from a tip end in a paper feed direction, on a transfer paper. A speed of the paper passing through a nip portion of the fixing device was 300 mm/s.

[Evaluation Standard of Cold Offset]

Very Good: The fixing lower limit temperature is lower than or equal to 130° C.

Good: The fixing lower limit temperature is higher than 130° C. and lower than or equal to 135° C.

Fair: The fixing lower limit temperature is higher than 135° C. and lower than or equal to 140° C.

Poor: The fixing lower limit temperature is higher than 140° C.

[Evaluation Standard of Hot Offset]

Very Good: The fixing upper limit temperature is higher than or equal to 175° C.

Good: The fixing upper limit temperature is higher than or equal to 170° C. and lower than 175° C.

Fair: The fixing upper limit temperature is higher than or equal to 165° C. and lower than 170° C.

Poor: The fixing upper limit temperature is lower than 165° C.

<Evaluation of Cardboard Low Temperature Fixing Properties>

The developer was mounted on the image forming device illustrated in FIG. 2, a rectangular solid image of 2 cm×15 cm was formed on OK Special Art Post+279.0GSM A4 Long Grain (manufactured by Ricoh Co., Ltd.) in a monochromic mode, such that the deposition amount of the toner was 0.40 mg/cm², and the fixing was performed while varying the temperature of the fixing belt was. Next, drawing was performed on the surface of the fixed image with a ruby needle having a tip end radius of 260 to 320 μm and a tip end angle of 60°, by using a drawing tester AD-401 (manufactured by Ueshima Seisakusho Co., Ltd.), in a condition of a load of 50 g, the drawn surface of the fixed image was strongly rubbed five times by using fiber Honeycotte #440 (manufactured by HONEYLON CORPORATION), and the temperature of the fixing belt at which there was no rubbing of image was set to the lower limit temperature. The solid image was prepared in a position of 3.0 cm from the tip end in the paper feed direction, on the transfer paper. The speed of the paper passing through the nip portion of the fixing device is 300 mm/s.

[Evaluation Standard of Cardboard Low Temperature Fixing Properties]

Very Good: The fixing lower limit temperature is lower than or equal to 160° C.

Good: The fixing lower limit temperature is higher than 160° C. and lower than or equal to 165° C.

Fair: The fixing lower limit temperature is higher than 165° C. and lower than or equal to 170° C.

Poor: The fixing lower limit temperature is higher than 170° C.

<Heat Resistant Preservability>

The toner was stored at 50° C. for 8 hours, and then, was sieved with a sieve of 42 meshes for 2 minutes, and a residual ratio on a wire net of the sieve was measured. The residual ratio is smaller as the heat resistant preservability of the toner is better.

An evaluation standard of the heat resistant preservability is as follows.

[Evaluation Standard]

Very Good: The residual ratio is less than 5%

Good: The residual ratio is greater than or equal to 5% and less than 15%

Fair: The residual ratio is greater than or equal to 15% and less than 30%

Poor: The residual ratio is greater than or equal to 30%

<Image Gloss>

A device, in which a fixing section of a copy machine MF2200 (manufactured by Ricoh Co., Ltd.) using a Teflon (Registered Trademark) roller was modified, was used as the fixing roller, and a copy test was performed on a type 6200 paper (manufactured by Ricoh Co., Ltd.). Specifically, a fixing temperature was set to the fixing lower limit temperature of +20° C., which was obtained at the time of evaluating the low temperature fixing properties, a linear velocity of the paper feeding was set to 120 mm/second to 150 mm/second, a surface pressure was set to 1.2 kgf/cm², and a nip width was set to 3 mm. A 60-degree gloss of an image after the copy test was measured by a gloss meter VG-7000 (manufactured by NIPPON DENSHOKU INDUSTRIES CO., LID.).

[Evaluation Standard]

Very Good: Greater than or equal to 30% and less than 35%

Good: Greater than or equal to 25% and less than 30%, or greater than or equal to 35% and less than 40%

Fair: Greater than or equal to 20% and less than 25%, or greater than or equal to 40% and less than 45%

Poor: Less than 20% or greater than or equal to 45%

<Image Density (Degree of Coloring)>

A carrier and a toner to be used in IMAGIO MP C4300 (manufactured by Ricoh Co., Ltd.) were mixed such that the density of the toner was 5 mass %, and thus, a developer was obtained.

The developer was put into a unit of IMAGIO MP C4300 (manufactured by Ricoh Co., Ltd.), and then, a rectangular solid image of 2 cm×15 cm was formed on a PPC paper type 6000<70W>A4 Long Grain (manufactured by Ricoh Co., Ltd.) such that the deposition amount of the toner was 0.40 mg/cm². At this time, the surface temperature of the fixing roller was set to 120° C. Next, an image density (ID) of a solid image was measured with d50 light, by using X-Rite938 (manufactured by X-Rite Inc.) in a status A mode.

[Evaluation Standard]

Very Good: Greater than or equal to 1.5

Good: Greater than or equal to 1.4 and less than 1.5

Fair: Greater than or equal to 1.2 and less than 1.4

Poor: Less than 1.2

<Evaluation of Image Crumpling>

A carrier and a toner to be used in IMAGIO MP C4300 (manufactured by Ricoh Co., Ltd.) were mixed such that the density of the toner was 5 mass %, and thus, a developer was obtained. The developer was put into IMAGIO MP C4300 (manufactured by Ricoh Co., Ltd.), a manuscript having an A4 size and an image area ratio of 25% were continuously printed in a monochromic color on 250 sheets of paper, and each image was evaluated according to an image crumpling evaluation rank. Evenness of a halftone portion was evaluated from the image crumpling.

[Evaluation Standard]

Very Good: No disadvantage at all

Good: No disadvantage

Fair: Slightly disadvantageous but acceptable

Poor: Disadvantageous

TABLE 3

| | Regular Paper Low Temperature Fixing Property | Hot-Offset Resistance | Cardboard Low Temperature Fixing Property | Heat Resistant Preservability | Image Gloss | Degree of Coloring | Crumbling |
|---|---|---|---|---|---|---|---|
| Example 1 | Very Good | Very Good | Good | Very Good | Very Good | Very Good | Very Good |
| Example 2 | Very Good | Fair | Good | Fair | Good | Very Good | Good |
| Example 3 | Fair | Good | Fair | Good | Good | Very Good | Good |
| Example 4 | Good | Fair | Fair | Good | Good | Very Good | Good |
| Example 5 | Fair | Very Good | Fair | Very Good | Good | Very Good | Very Good |
| Example 6 | Good | Very Good | Fair | Very Good | Fair | Fair | Good |
| Example 7 | Very Good | Fair | Good | Fair | Good | Very Good | Good |
| Example 8 | Fair | Good | Fair | Good | Good | Very Good | Good |
| Example 9 | Very Good | Very Good | Very Good | Very Good | Very Good | Very Good | Very Good |
| Example 10 | Very Good | Very Good | Good | Very Good | Very Good | Very Good | Very Good |
| Example 11 | Very Good | Very Good | Very Good | Fair | Very Good | Very Good | Very Good |
| Example 12 | Very Good | Fair | Very Good | Fair | Very Good | Very Good | Very Good |
| Example 13 | Fair | Very Good | Fair | Very Good | Fair | Fair | Good |
| Comparative Example 1 | Very Good | Good | Good | Poor | Good | Very Good | Fair |
| Comparative Example 2 | Poor | Very Good | Poor | Very Good | Good | Very Good | Very Good |
| Comparative Example 3 | Very Good | Good | Good | Poor | Good | Very Good | Fair |
| Comparative Example 4 | Poor | Very Good | Poor | Very Good | Good | Very Good | Very Good |
| Comparative Example 5 | Very Good | Fair | Good | Good | Poor | Very Good | Poor |
| Comparative Example 6 | Poor | Very Good | Poor | Very Good | Good | Very Good | Very Good |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A toner comprising:
a polyester resin,
wherein the toner has a glass transition temperature (Tg1st) at first temperature rising of differential scanning calorimetry (DSC) of from 45° C. to 65° C.,
wherein the toner includes a component insoluble in tetrahydrofuran (THF) having two glass transition temperatures (Tga1st and Tgb1st) at the first temperature rising of DSC, Tga1st being in a range of −45° C. to 5° C., and Tgb1st being in a range of 45° C. to 70° C., and
wherein the toner includes a component soluble in THF having a glass transition temperature (Tg2nd) at second temperature rising of DSC of from 40° C. to 65° C.

2. The toner according to claim 1,
wherein the component insoluble in THF has a glass transition temperature (Tg2nd') at the second temperature rising of DSC of from 0° C. to 50° C.

3. The toner according to claim 1,
wherein the glass transition temperature (Tg1st) and a glass transition temperature (Tg2nd) of the toner at the first temperature rising and the second temperature rising, respectively, of DSC satisfy the following formula:

$$Tg1st - Tg2nd \geq 10\ [°\ C.].$$

4. The toner according to claim 1,
wherein the component insoluble in THF includes:
a polyester resin component A having a glass transition temperature (Tg2nd) at the second temperature rising of DSC of from −50° C. to 0° C.; and
a polyester resin component B having a glass transition temperature (Tg2nd) at the second temperature rising of DSC of from 45° C. to 65° C., and
wherein the component soluble in THF includes:
a polyester resin component C having a glass transition temperature (Tg2nd) at the second temperature rising of DSC of from 40° C. to 65° C.

5. The toner according to claim 4,
wherein the following formula is satisfied:

$$4(a+b) < c$$

where a, b, and c respectively represent mass ratios of the polyester resin component A, the polyester resin component B, and the polyester resin component C, with respect to a total mass of the polyester resin component A, the polyester resin component B, and the polyester resin component C.

6. The toner according to claim 4,
wherein the polyester resin component A contains a trivalent or tetravalent aliphatic polyvalent alcohol component having 3 to 10 carbon atoms.

7. The toner according to claim 4,
wherein the polyester resin component A contains a diol component, and
wherein the diol component has a main chain having carbon atoms in an odd number of from 3 to 9 and an alkyl group on a side chain.

8. The toner according to claim 4,
wherein the polyester resin component A has at least one of a urethane bond and a urea bond.

9. The toner according to claim 4,
wherein the polyester resin component B has at least one of a urethane bond and a urea bond.

10. The toner according to claim 4,
wherein the polyester resin component C contains a trivalent or tetravalent aliphatic polyvalent alcohol component having 3 to 10 carbon atoms.

11. A developer comprising:
the toner according to claim 1; and
a carrier.

12. An image forming device comprising:
an electrostatic latent image bearer;
an electrostatic latent image forming unit configured to form an electrostatic latent image on the electrostatic latent image bearer; and
a developing unit including the toner according to claim 1, the developing unit configured to develop the electrostatic latent image on the electrostatic latent image bearer into a toner image with the toner.

13. The image forming device according to claim 12,
wherein the electrostatic latent image bearer has a linear velocity of greater than or equal to 300 mm/s.

* * * * *